United States Patent
Wang et al.

(10) Patent No.: US 11,700,638 B2
(45) Date of Patent: Jul. 11, 2023

(54) COLLABORATIVE SENSING AND SHARING FOR SIDELINK COMMUNICATIONS

(71) Applicant: QUALCOMM Incorporated, San Diego, CA (US)

(72) Inventors: Xiaojie Wang, Hillsborough, NJ (US); Junyi Li, Franklin Park, NJ (US); Piyush Gupta, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 140 days.

(21) Appl. No.: 17/174,162

(22) Filed: Feb. 11, 2021

(65) Prior Publication Data
US 2022/0256591 A1 Aug. 11, 2022

(51) Int. Cl.
*H04W 74/00* (2009.01)
*H04W 74/08* (2009.01)
(Continued)

(52) U.S. Cl.
CPC .......... *H04W 74/008* (2013.01); *H04W 8/24* (2013.01); *H04W 72/02* (2013.01);
(Continued)

(58) Field of Classification Search
CPC ..... H04W 74/008; H04W 8/24; H04W 72/02; H04W 72/0446; H04W 72/1263; H04W 74/0816
See application file for complete search history.

(56) References Cited

U.S. PATENT DOCUMENTS

2017/0201461 A1* 7/2017 Cheng .................... H04L 43/16
2019/0387377 A1* 12/2019 Zhang ................. H04W 84/005
(Continued)

FOREIGN PATENT DOCUMENTS

WO WO-2022027592 A1 * 2/2022

OTHER PUBLICATIONS

Lenovo et al., "Sidelink Resource Allocation for Power Saving", 3GPP TSG RAN WG1 #104-e, R1-2100766, 3rd Generation Partnership Project, Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 18, 2021, XP051970512, 9 Pages.

*Primary Examiner* — Chae S Lee
(74) *Attorney, Agent, or Firm* — Arun Swain; Holland & Hart LLP

(57) ABSTRACT

Methods, systems, and devices for wireless communication are described. A user equipment (UE) may belong to a group of UEs and may identify a channel sensing schedule for the group of UEs. The channel sensing schedule may include sensing windows and resource reservation windows corresponding to each UE of the group of UEs. The channel sensing schedule may establish a pattern for the sensing windows and resource reservation windows such that the UEs may take turns performing sensing and resource selection. During a sensing window associated with the UE, the UE may sense a set of resources of a sidelink communication link to identify candidate resources. The UE may transmit, to the other UEs of the group, a message indicating results of the sensing, such as an indication of resource reservations, candidate resources, or the like. The other UEs may identify and select candidate resources based on the message.

30 Claims, 16 Drawing Sheets

(51) Int. Cl.
*H04W 8/24* (2009.01)
*H04W 72/1263* (2023.01)
*H04W 72/0446* (2023.01)
*H04W 72/02* (2009.01)

(52) U.S. Cl.
CPC ... *H04W 72/0446* (2013.01); *H04W 72/1263* (2013.01); *H04W 74/0816* (2013.01)

(56) References Cited

U.S. PATENT DOCUMENTS

| | | | |
|---|---|---|---|
| 2020/0229171 A1* | 7/2020 | Khoryaev | H04B 7/0413 |
| 2020/0280961 A1* | 9/2020 | Lee | H04W 72/02 |
| 2020/0314804 A1* | 10/2020 | Shin | H04W 24/10 |
| 2022/0225408 A1* | 7/2022 | Lee | H04W 4/40 |

* cited by examiner

```
┌─────────────────────────────────────────┐
│  Transmit, to at least one UE of a plurality of UEs, a  │
│  message indicating a channel sensing capability of a first │
│  UE, data traffic conditions of the first UE, or any    │
│  combination thereof                                     │
└─────────────────────────────────────────┘ ⎯ 1605
                    │
                    ▼
┌─────────────────────────────────────────┐
│  Identify one or more candidate resources of a sidelink │
│  communication link according to a channel sensing      │
│  schedule for a set of multiple UEs, the plurality of UEs │
│  comprising at least the first UE and a second UE different │
│  from the first UE, wherein the channel sensing schedule │
│  comprises at least a first sensing window associated with │
│  the first UE and a second sensing window associated with │
│  the second UE, and wherein the channel sensing schedule │
│  is based at least in part on the channel sensing capability, │
│  the data traffic conditions, or any combination thereof │
└─────────────────────────────────────────┘ ⎯ 1610
                    │
                    ▼
┌─────────────────────────────────────────┐
│  Perform sensing of a set of resources of the sidelink  │
│  communication link during the first sensing window     │
│  based at least in part on the channel sensing schedule, the │
│  sensing being performed in accordance with a pattern   │
│  established by the channel sensing schedule, wherein the │
│  second UE senses the set of resources during the second │
│  sensing window based at least in part on the pattern   │
└─────────────────────────────────────────┘ ⎯ 1615
```

COLLABORATIVE SENSING AND SHARING FOR SIDELINK COMMUNICATIONS

FIELD OF TECHNOLOGY

The following relates to wireless communication, including collaborative sensing and sharing for sidelink communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communication systems may support sidelink communications between wireless devices. For example, a user equipment (UE) may communicate with other UEs via a sidelink channel. In some examples, the UE may perform a sensing procedure to determine occupied or available resources for sidelink communications with the other UEs over a sidelink communication link.

SUMMARY

The described techniques relate to improved methods, systems, devices, and apparatuses that support collaborative sensing and sharing for sidelink communications. Generally, the described techniques provide for two or more user equipment (UEs) communicating via sidelink communication link to collaborate in performing sensing procedures and sharing sensing result information with one another. The UEs may perform sensing according to a channel sensing schedule that includes respective sensing windows for each UE. For instance, a first sensing window may be associated with a first UE and a second sensing window may be associated with a second UE. The channel sensing schedule may establish a pattern for the first and second sensing windows during which the UEs perform sensing of one or more channels or sub-channels of the sidelink communication link. That is, each UE may perform a sensing procedure during an associated sensing window (e.g., alternate sensing sidelink resources in the frequency- or time-domain), where the sensing windows have a time duration set forth by the channel sensing schedule. Additionally or alternatively, each sensing window may correspond to some frequency resources (e.g., a subset of frequency resources) in which sensing may be performed. During the sensing procedure, a UE may receive and decode control signals (e.g., sidelink control information (SCI)) within a resource sensing window and may obtain information regarding which resources are available or unavailable for transmissions. For instance, some resources may be reserved by other UEs and may therefore be unavailable for transmissions by the UE. In some examples, when a UE is not sensing the resources of the sidelink, the UE may be in a power-saving mode or a transmission mode while one or more other UEs are performing sensing of the resources.

The UE may share information obtained during the sensing procedure with one or more other UEs via a sidelink message. The information may include indications of available resources, unavailable resources, reference signal received power (RSRP) measurements, or other information regarding the resources sensed by the UE during the sensing procedure. The other UE(s) may use the information to determine resources for transmitting messages on the sidelink communication link, for instance, by selecting resources during a resource selection window and transmitting messages during a transmission opportunity. In some cases, the UEs may perform sensing procedures at different times or in different sets of frequency resources; by alternating sensing in such a manner and sharing information about the sensing procedures with one another, the UEs may reduce power consumption.

A method for wireless communication at a first UE is described. The method may include identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE and performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

An apparatus for wireless communication at a first UE is described. The apparatus may include a processor, memory coupled with the processor, and instructions stored in the memory. The instructions may be executable by the processor to cause the apparatus to identify one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE and perform sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

Another apparatus for wireless communication at a first UE is described. The apparatus may include means for identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE and means for performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

A non-transitory computer-readable medium storing code for wireless communication at a first UE is described. The code may include instructions executable by a processor to identify one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE and perform sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

Some examples of the method, apparatuses, and non-transitory computer-readable medium described herein may further include operations, features, means, or instructions for transmitting, to the set of multiple UEs, a message indicating sensing results based on sensing the set of resources during the first sensing window and the channel sensing schedule.

In some examples of the method, apparatuses, and non-transitory computer-readable medium described herein, performing the sensing of the set of resources may include operations, features, means, or instructions for determining a RSRP threshold that provides a percentage of candidate resources in a resource selection window based on decoding sidelink information received on the sidelink communication link, where the message indicating the sensing results includes an indication of the RSRP threshold, the percentage of candidate resources, or any combination thereof.

In some examples of the method, apparatuses, and non-transitory computer-readable medium described herein, the RSRP threshold, the percentage of candidate resources, or any combination thereof, may be configured by one or more UEs of the set of multiple UEs.

In some examples of the method, apparatuses, and non-transitory computer-readable medium described herein, performing the sensing of the set of resources may include operations, features, means, or instructions for decoding SCI received on the sidelink communication link and performing the sensing of the set of resources based on one or more resource reservations indicated by the decoded SCI, where the message indicating the sensing results includes resource information from the decoded SCI.

In some examples of the method, apparatuses, and non-transitory computer-readable medium described herein, the resource information includes an indication of a RSRP for each resource of the set of resources, an indication of resources reserved based on the one or more resource reservations, an indication of the one or more candidate resources based on the one or more resource reservations, or any combination thereof.

In some examples of the method, apparatuses, and non-transitory computer-readable medium described herein, the message indicating the sensing results includes one or more RSRP measurement values that may be based on performing the sensing of the set of resources.

In some examples of the method, apparatuses, and non-transitory computer-readable medium described herein, the message indicating the sensing results excludes one or more RSRP measurement values that may be based on performing the sensing of the set of resources.

Some examples of the method, apparatuses, and non-transitory computer-readable medium described herein may further include operations, features, means, or instructions for operating in a transmission mode during the second sensing window based on the second UE performing sensing of the set of resources during the second sensing window and the channel sensing schedule and transmitting one or more messages on the sidelink communication link during the second sensing window based on operating in the transmission mode, the one or more messages transmitted on resources selected from the one or more candidate resources during a resource selection window.

Some examples of the method, apparatuses, and non-transitory computer-readable medium described herein may further include operations, features, means, or instructions for receiving, from a third UE of the set of multiple UEs, a message indicating sensing results based on the third UE sensing the set of resources during a third sensing window that may be before the first sensing window and identifying, during the resource selection window, the one or more candidate resources from the set of resources based on the sensing results from the third UE and the channel sensing schedule, the resource selection window subsequent to the third sensing window.

In some examples of the method, apparatuses, and non-transitory computer-readable medium described herein, the one or more candidate resources may be identified during the first sensing window.

Some examples of the method, apparatuses, and non-transitory computer-readable medium described herein may further include operations, features, means, or instructions for operating in a power saving mode based on the second UE performing sensing of the set of resources during the second sensing window.

Some examples of the method, apparatuses, and non-transitory computer-readable medium described herein may further include operations, features, means, or instructions for determining a first duration of the first sensing window and a second duration of the second sensing window based on the channel sensing schedule and the pattern, where the first duration, or the second duration, or both, may be different from a duration of another sensing window associated with channel sensing operations that exclude the channel sensing schedule.

In some examples of the method, apparatuses, and non-transitory computer-readable medium described herein, the first duration of the first sensing window, the second duration of the second sensing window, or any combination thereof, may be configured by one or more UEs of the set of multiple UEs.

Some examples of the method, apparatuses, and non-transitory computer-readable medium described herein may further include operations, features, means, or instructions for determining one or more subsets of frequency resources associated with the channel sensing schedule, where the first UE senses a first subset of frequency resources from the one or more subsets of frequency resources during the first sensing window, and where the second UE senses a second subset of frequency resources from the one or more subsets of frequency resources during the second sensing window.

In some examples of the method, apparatuses, and non-transitory computer-readable medium described herein, the pattern indicates that sensing may be performed using the one or more subsets of frequency resources, or one or more sensing windows, or any combination thereof.

Some examples of the method, apparatuses, and non-transitory computer-readable medium described herein may further include operations, features, means, or instructions for determining a resource selection window duration of the channel sensing schedule based on the pattern, where the resource selection window duration may be independent of a packet delay budget.

In some examples of the method, apparatuses, and non-transitory computer-readable medium described herein, the resource selection window duration may be configured by one or more UEs of the set of multiple UEs.

Some examples of the method, apparatuses, and non-transitory computer-readable medium described herein may further include operations, features, means, or instructions for transmitting, to at least one UE of the set of multiple UEs, a message indicating a channel sensing capability of the first UE, data traffic conditions of the first UE, or any combination thereof, where the channel sensing schedule may be based on the channel sensing capability, the data traffic conditions, or any combination thereof.

In some examples of the method, apparatuses, and non-transitory computer-readable medium described herein, the first sensing window and the second sensing window at least partially overlap in a time domain.

Some examples of the method, apparatuses, and non-transitory computer-readable medium described herein may further include operations, features, means, or instructions for identifying respective resource selection windows corresponding to the first sensing window and the second sensing window based on the pattern, where the respective resource selection windows may be continuous in the time domain, discontinuous in the time domain, or any combination thereof.

In some examples of the method, apparatuses, and non-transitory computer-readable medium described herein, the set of multiple UEs include a same group of UEs based on a location of the set of multiple UEs, a proximity of the set of multiple UEs, or any combination thereof.

BRIEF DESCRIPTION OF THE DRAWINGS

FIGS. 12 through 16 show flowcharts illustrating methods in accordance with aspects of the present disclosure.

DETAILED DESCRIPTION

Figure 1:
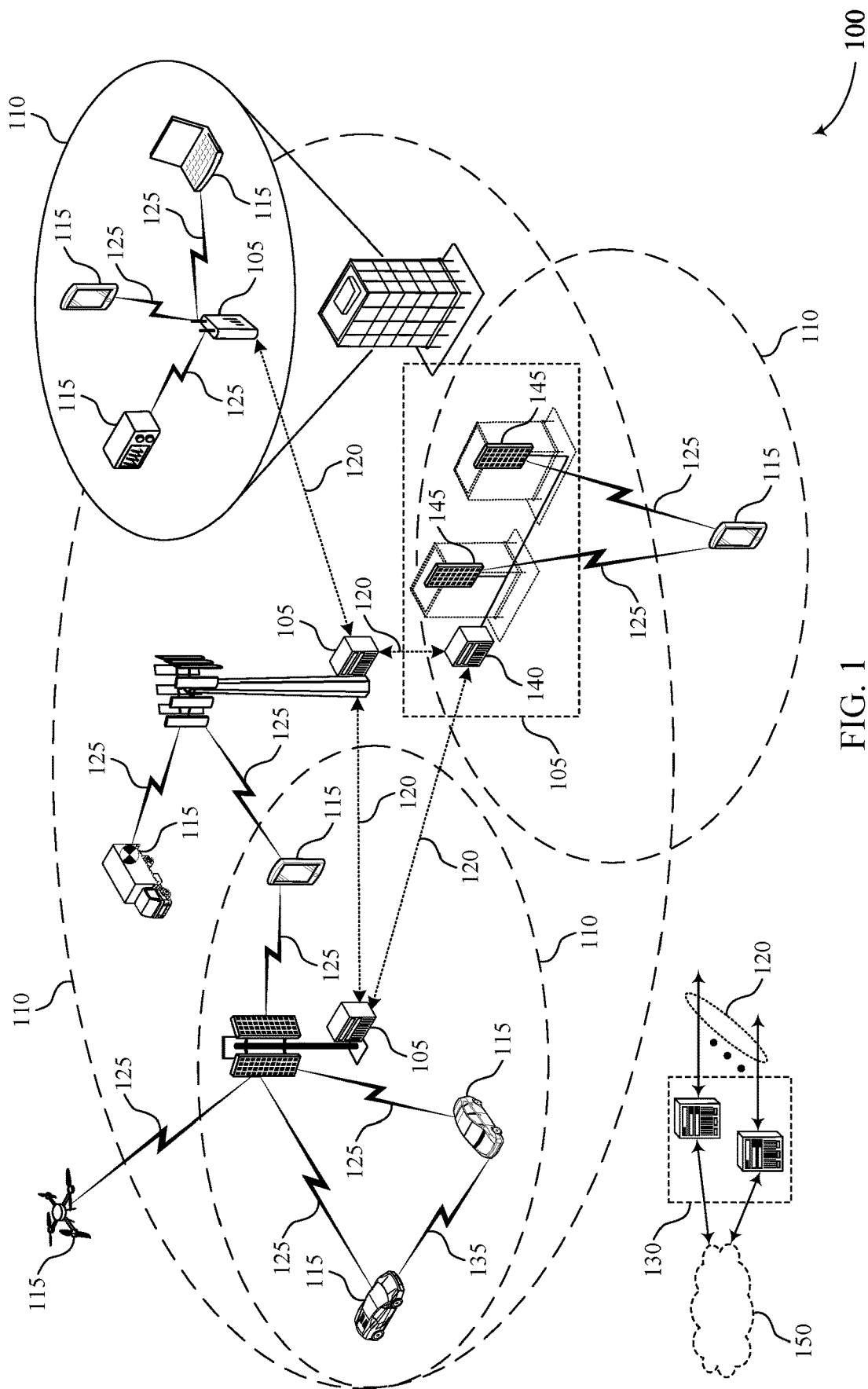
FIGS. 1 and 2 illustrate examples of wireless communications systems in accordance with aspects of the present disclosure.

Some wireless communications systems may support sidelink communications such that user equipment (UEs) may communicate with each other over a sidelink channel. UEs communicating via sidelink may operate in a mode that determines how resources (e.g., time resources, frequency resources) are selected for sidelink communications. For example, a UE operating in a first mode (e.g., mode 1) may have an active connection with a base station and the base station may indicate, via control information (e.g., downlink control information (DCI)), resources for the UE to use. Alternatively, the UE may operate in a second mode (e.g., mode 2) and may self-select resources. For example, a UE may perform a channel sensing procedure (e.g., during a sensing window) to sense a set (e.g., a pool) of resources and determine which, if any, resources are available. During the sensing procedure, the UE may receive and decode control signals (e.g., sidelink control information (SCI)) transmitted by other UEs, which may indicate scheduling information and/or reserved or occupied resources. The UE may also measure reference signal(s) received power (RSRP) of the resources and may compare the measured RSRP to a threshold value to determine resource availability. The UE may select resources (e.g., by random selection) from the available resources during a resource selection window, and may use the selected resources to perform sidelink transmissions.

However, performing a sensing procedure may consume significant power, and a UE operating in a mode 2 may need to perform sensing before any transmission. Further, UEs in close proximity to one another may have a same or similar resource pool and may therefore achieve the same or similar sensing results when each UE senses the same or approximately the same resources. Such duplicative sensing (e.g., of the same resources) by multiple, different UEs may waste power and lead to other inefficiencies.

Thus, as described herein, UEs communicating via a sidelink communication link may conserve power and reduce latency by performing sensing procedures in a collaborative manner and sharing sensing results. In other words, instead of each UE performing a sensing procedure on the same set of resources when the results of the sensing procedures may be substantially the same, the UEs may take turns sensing and may share the results with one another. The UEs may select resources to use for transmissions based on the shared results, for instance, during a resource selection window. Such techniques may reduce power consumption at each UE, as each UE may perform fewer sensing procedures over time. Additionally or alternatively, such techniques may enable a UE to operate in a power saving mode while the other UE(s) perform sensing.

According to the techniques described herein, a group of UEs (e.g., that are close in location and/or proximity to one another and may therefore have the same resource pool from which to select resources) may configure a channel sensing schedule, where each UE of the group of UEs may perform a sensing procedure during a sensing window according to a pattern established by the channel sensing schedule. Each UE may share the results of the respective sensing procedure, such that a UE may select resources to use for transmissions based on the sensing results (i.e., a UE may select resources based on results from a sensing procedure performed by another UE). In some aspects, one or more UEs of the group of UEs may configure the channel sensing schedule and/or the associated pattern. For instance, the UEs may determine parameters for sensing windows (e.g., duration, periodicity, etc.), parameters for one or more resource selection windows (e.g., duration, periodicity, etc.), subsets of resources to sense, or the like. In some examples, the configuring may be negotiated amongst the UEs; for instance, each UE may communicate preferred parameters, a channel sensing capability, a traffic profile, or other conditions, and the group of UEs may configure the channel sensing schedule accordingly.

The channel sensing schedule may thus establish a pattern of sensing windows and resource selection windows to enable the group of UEs to take turns performing sensing procedures, selecting resources, and performing transmissions. As an example, based on the channel sensing schedule, a first UE may perform sensing during a first sensing window and a second UE may perform sensing during a second sensing window, where the first UE and the second UE may each sense a different set of resources and/or the first sensing window and the second sensing window may have different durations or may occur at different times. Each UE may share the results of the sensing procedure, e.g., by transmitting a message including the results to the other UEs. A UE receiving the message may use the results to select, during a resource selection window occurring according to the pattern, one or more resources from the set of sensed resources, and may transmit a sidelink message using the selected resources.

Aspects of the disclosure are initially described in the context of wireless communications systems. Aspects of the disclosure are then described with reference to sensing procedures and channel sensing schedules, as well as a process flow. Aspects of the disclosure are further illustrated by and described with reference to apparatus diagrams, system diagrams, and flowcharts that relate to collaborative sensing and sharing for sidelink communications.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, two UEs 115 may communicate with each other via a communication link 135 (e.g., a sidelink or a sidelink communication link). In such cases, for example, a first UE 115 may receive one or more sidelink transmissions from a second UE 115 over a sidelink channel, which may include one or both of a sidelink control channel or a sidelink data channel. For example, the first UE 115 may receive a first part of SCI (which may be referred to herein as SCI-1) over a sidelink control channel, such as a physical sidelink control channel (PSCCH), and a second part of SCI (which may be referred to herein as SCI-2) and data over a sidelink data channel, such as a physical sidelink shared channel (PSSCH).

To receive a sidelink transmission (e.g., an SCI-1, an SCI-2, etc.), the first UE 115 may perform blind decoding over sidelink subchannels. In some examples, there may be between 1 and 27 sidelink subchannels, and the first UE 115 may be capable of performing blind decoding over the entirety of the sidelink subchannels. For example, the first UE 115 may have a blind decoding limit associated with a capability of the first UE 115 such that blind decoding any number of subchannels between 1 and 27 is within the blind decoding limit of the first UE 115. The first UE 115 may receive PSCCH and PSSCH in a same slot, where the PSSCH may occupy a number of contiguous subchannels and the PSCCH may occupy up to one subchannel (e.g., a subchannel with the lowest subchannel index).

The first UE 115 may receive and decode an SCI-1 in the PSCCH, where the SCI-1 includes PSSCH bandwidth information and resource reservations for future slots. After decoding the PSCCH, the first UE 115 may receive an SCI-2. The SCI-2 may include a source identifier indicating the transmitting device (e.g., the second UE 115, a base station 105) and/or a destination identifier indicating the receiving device (e.g., the first UE 115, the second UE 115, a different UE 115, etc.). The first UE 115 may use the destination identifier to determine whether the SCI-2 is for the first UE 115.

In some deployment scenarios, such as in cellular V2X (C-V2X) deployments or in industrial IoT deployments, the first UE 115 and the second UE 115 may determine or otherwise identify a resource allocation for communications between the first UE 115 and the second UE 115 (which may be carried over a PC5 link) according to various modes. In a first mode (e.g., mode 1), for example, a serving base station 105 may assign the transmission resources for sidelink communications between the first UE 115 and the second UE 115 through downlink control information (DCI), such as DCI 3_0. For example, in the first mode, the base station 105 may transmit, to at least one of the first UE 115 or the second UE 115, the DCI 3_0 indicating an allocation of time and frequency resources and a transmission timing. Further, in the first mode, the serving base station 105 may support dynamic grants or configured grants, including configured grants type 1 (which may be activated via RRC signaling from the base station 105) and configured grants type 2 (which may be provided by a downlink control channel and activated via layer 1 (L1) signaling). The second UE 115 may select a modulation and coding scheme (MCS) for a sidelink transmission within a limit (e.g., from a configured set or range of MCSs) set by the base station 105.

In a second mode, the second UE 115 (e.g., the transmitting UE 115), may autonomously (e.g., without signaling from the base station 105) select resources for sidelink communications between the first UE 115 and the second UE 115. Further, in the second mode, the second UE 115 may perform channel sensing based on blind decoding PSCCH channels (e.g., all PSCCH channels) to determine or otherwise identify which resources of the PSCCH are reserved by other sidelink transmissions. The second UE 115 may perform sensing on a Physical layer (e.g., a PHY layer), and may report which resources of the PSCCH are available (e.g., which resources of the sensed PSSCH are not reserved by other sidelink transmissions) to an upper layer (e.g., a medium access control (MAC) layer) and the upper layer may decide or otherwise determine resource usage for a sidelink transmission to the first UE 115.

Similarly, the first UE 115 may perform blind decoding in each (e.g., every) subchannel of a sidelink resource pool to find the SCI-1 carried over the PSCCH. Such a resource pool may include a number of subchannels over a number of slots and may be shared among a number of UEs 115. Resource management of the resource pool may either be performed at the base station 105 (in examples in which the devices communicate in the first mode) or at the UE 115, where the UE 115 may autonomously select available resources from the resource pool (in examples in which the devices communicate in the second mode).

In some implementations of the present disclosure, the first UE 115, the second UE 115, and a third UE 115 may belong to a same group of UEs 115 (e.g., based on the location of the UEs 115, the proximity of the UEs 115, or the like) and may communicate over a sidelink (e.g., a communication link 135). Each UE 115 of the group of UEs 115 may, for example, operate in the second mode and may therefore perform channel sensing to self-select resources from a shared resource pool. In some cases, performing the channel sensing may include decoding SCI to determine resource reservations, determining an RSRP threshold that enables a percentage of candidate resources, or measuring an RSRP of each resource, among other examples.

According to the techniques described herein, the first UE 115, the second UE 115, and the third UE 115 (and any other UEs 115 belonging to the group of UEs 115) may take turns performing channel sensing according to a channel sensing schedule. For example, the first UE 115 may perform sensing during a first sensing window associated with the first UE 115. The second UE 115 may perform sensing during a second sensing window associated with the second UE 115, e.g., where the second sensing window is subsequent to the first sensing window. After performing sensing, the first UE 115 may transmit a message indicating sensing results to the second UE 115, the third UE 115, and any other UEs 115 of the group of UEs 115. The second UE 115 may similarly transmit a message indicating sensing results after the second sensing window. In some examples, the first UE 115, the second UE 115, and the third UE 115 may perform resource selection during respective resource selection windows based on the channel sensing schedule. For instance, the first UE 115 may select resources during a first resource selection window that occurs during the second sensing window. The second UE 115 may select resources during a second resource selection window, e.g., which may be subsequent to the second sensing window; the second UE 115 may select resources based on the sensing results indicated by the first UE 115 and/or the sensing procedure performed by the second UE 115. The third UE 115 may select resources during a third resource selection window, where the third UE 115 selects resources based on the sensing results indicated by the first UE 115 and the second UE 115. That is, the third UE 115 may select resources to use for a transmission without itself performing a sensing procedure.

In some cases, a UE 115 that is not performing sensing may operate in a power saving mode or a transmission mode. In the example above, the second UE 115 may operate in a power saving mode during the first sensing window (e.g., while the first UE 115 performs sensing). Additionally, or alternatively, the first UE 115 may operate in a transmission mode during the second sensing window; that is, while the second UE 115 is performing sensing, the UE 115 may transmit a message on the resources selected during the first resource selection window. The third UE 115 may operate in a power saving mode during the first sensing window and the second sensing window, and may wake to receive the sensing result messages. Thus, by alternating sensing procedures as described herein, the first, second, and third UEs 115 may perform sensing procedures less often and may operate in a power saving mode more frequently, reducing power consumption and increasing battery life at each device.

Figure 2:
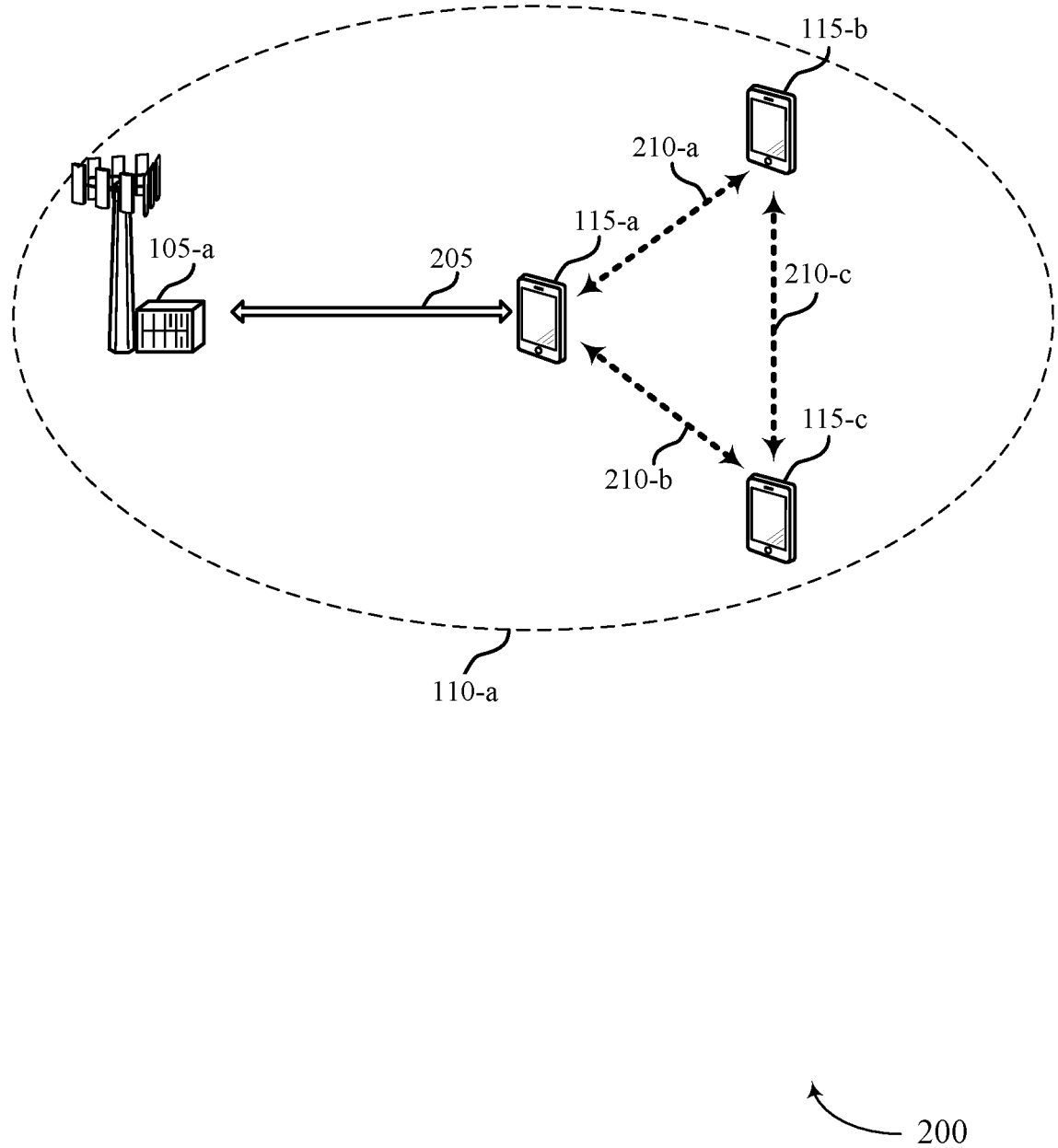

FIG. 2 illustrates an example of a wireless communications system 200 in accordance with aspects of the present disclosure. The wireless communications system 200 may implement aspects of the wireless communications system 100. For example, the wireless communications system 200 may include a coverage area 110-a and UEs 115 and a base station 105, which may be examples of the corresponding devices described herein. The UE 115-a may communicate with the base station 105-a via a communication link 205. The UEs 115 may communicate with one another via sidelinks 210 (e.g., sidelink communication links). The sidelink communications may be referred to as device-to-device (D2D) communications, vehicle-to-vehicle (V2V) communications, vehicle-to-everything (V2X) communications, or the like.

The UEs 115 in FIG. 2 may operate in a mode 1 or a mode 2 for sidelink communications. In mode 1, for example, the UE 115-a may receive an indication of a resource allocation from the base station 105-a via communication link 205. Here, the base station 105-a may assign transmission resources for sidelink communications between the UE 115-a and the UEs 115-b and 115-c through DCI. For example, the base station 105-a may transmit, to the UE 115-a, a DCI indicating an allocation of time and frequency resources and a transmission timing. The UE 115-a may transmit a sidelink transmission to the UE 115-b and/or the UE 115-c via the corresponding sidelink 210 using the allocated resources.

In mode 2, the UEs 115 may autonomously (e.g., without signaling from the base station 105-a) select resources from a resource pool for the sidelink communications. For example, a UE 115-a may perform channel sensing based on blind decoding PSCCH channels (e.g., all PSCCH channels) to determine or otherwise identify which resources of the resource pool are reserved by other sidelink transmissions. The pool of resources may include a number of subchannels over a number of slots and may be shared among the UEs 115, and the UE 115-a may perform a sensing procedure, during a sensing window, over the set of resources to determine occupied (e.g., unavailable) or candidate (e.g., available) resources to use for sidelink transmissions. For example, some subchannels may be reserved for use by the other UEs 115 or may experience relatively high levels of interference such that, even if the UE 115-a transmits a message over those subchannels, a receiving UE 115 would have a relatively low likelihood of successfully receiving and decoding the message.

During a sensing window, a UE 115 (e.g., the UE 115-a, in addition to the UEs 115-b and 115-c) may perform channel sensing (e.g., sidelink channel sensing) by decoding SCI to identify the occupied or available sidelink resources. In the example of FIG. 2, each SCI received by the UE 115 may be broadcast by a respective UE 115 (e.g., UE 115-a may broadcast an SCI, UE 115-b may broadcast an SCI, UE 115-c may broadcast an SCI, and so forth) and may indicate sidelink resources reserved by the respective UE 115. The sensing may be performed by a first layer, such as a PHY layer, of a protocol stack of the UE 115, for example, by decoding scheduling information included in the SCI(s). The UE 115 (e.g., the PHY layer of the UE 115) may receive the SCI during a sensing window and may use the information included in the SCI to identify or otherwise determine available resources, e.g., resources that are not indicated as being reserved in the SCI(s).

Additionally, or alternatively, the UE 115 may determine an RSRP for each resource of the set of resources and may compare the RSRP for each resource with a threshold RSRP. For instance, if the RSRP for a given resource satisfies the threshold, that resource may be considered an available resource. In some examples, the UE 115 may determine the RSRP threshold such that the RSRP threshold enables a percentage of candidate resources. Based on the results of the sensing procedure (i.e., based on identifying candidate resources), the UE 115 may select resources to use for transmitting one or more sidelink transmissions during a resource selection window.

However, performing channel sensing may be power-intensive, especially as the UE 115 may perform the sensing procedure and select resources before every transmission. Additionally, UEs 115 (e.g., UEs 115-a, 115-b, and 115-c) in a same group, such as UEs 115 in a same location or in close proximity to one another, may achieve the same or similar results, as the candidate resources may be identified from the same resource pool. Thus, according to the techniques described herein, the UEs 115 may take turns sensing a sidelink channel and sharing the sensing results with one another. The UEs 115 may perform the sensing according to a channel sensing schedule. For instance, the channel sensing schedule may provide a pattern of sensing windows and resource selection windows such that the UEs 115 may avoid performing sensing at the same time or duplicating sensing efforts across devices.

In the example of FIG. 2, the UEs 115-a, 115-b, and 115-c may operate in a mode 2. Thus, the UEs 115-a, 115-b, and 115-c may not receive sidelink resource allocation information from the base station 105-a and may autonomously select resources for communicating with one another. The UEs 115 may form a group of UEs, for instance, based on a location of the UEs 115, a proximity of the UEs 115, or other conditions, and may configure a channel sensing schedule that includes sensing windows, resource selection windows, or both, as well as associated parameters. The group of UEs 115 may configure the channel sensing schedule by negotiating the channel sensing schedule with one another. For example, each UE 115 may transmit a message indicating a preferred pattern, a preferred window duration, a sensing capability, a traffic profile (e.g., data traffic conditions), or the like. In some cases, the UEs 115 may transmit the message to a number of other UEs 115 or to a single UE 115; the channel sensing schedule may thus be determined via negotiation among a number of UEs 115 or by the single UE 115. In any case, the channel sensing schedule may be determined by an upper layer (e.g., an RRC layer, an application layer, etc.) based on the indicated preferences, capabilities, traffic conditions, or the like. In some examples, the channel sensing schedule may be dynamically negotiated (e.g., may be updated if preferences or traffic conditions change, etc.). For example, a UE 115 may transmit a message indicating a change in a traffic profile and may request to change (or establish) the channel sensing schedule accordingly.

The channel sensing schedule may divide (e.g., in the time domain, in the frequency domain) sensing opportunities between the UEs 115. As an example, the channel sensing schedule may include a first sensing window associated with UE 115-a, a second sensing window associated with UE 115-b, and a third sensing window associated with UE 115-c. Additionally, the channel sensing schedule may include a first resource selection window associated with UE 115-a, a second resource selection window associated with UE 115-b, and a third resource selection window associated with UE 115-c. The channel sensing schedule may establish a pattern for the sensing windows and/or resource selection windows. For instance, the sensing windows may overlap in the time domain, the resource selection windows may be continuous or discontinuous in the time domain, etc. Additionally, the channel sensing schedule may establish parameters for the sensing windows and/or resource selection windows, such as a duration of each sensing window, a duration of each resource selection window, or a subset of resources (e.g., a subset of frequency resources) for the UE 115 to sense during a sensing window, among other examples.

The UE 115-a may perform sensing during the first sensing window, which may occur at the same time (i.e., may overlap in the time domain) as the second and/or third resource selection windows associated with UE 115-b and UE 115-c, respectively. The UE 115-a may transmit, to the UE 115-b and the UE 115-c, a message indicating sensing results, such that the UEs 115-b and 115-c may select resources based on the sensing results. After transmitting the message and based on the channel sensing schedule, the UE 115-a may select resources during the first resource selection window; that is, the first resource selection window may be subsequent to the first sensing window. The second sensing window may also be subsequent to the first sensing window and, in some cases, may partially overlap in time with the first sensing window, e.g., the UE 115-b begins to perform sensing near the end of the first sensing window, and the UE 115-a performs resource selection while the UE 115-b performs sensing. The UE 115-b may transmit a message to the UEs 115-a and 115-c indicating the respective sensing results after the second sensing window. The third sensing window and the second resource selection window may be subsequent to the second sensing window, and the UE 115-c may perform sensing while the UE 115-b performs resource selection. In some examples, a UE 115 may operate in a power saving mode or a transmission mode during a sensing window associated with another UE 115. In this manner, the UEs 115 may alternate sensing windows and may use the results obtained by other UEs 115 to select resources during the associated resource selection windows.

Figure 3:
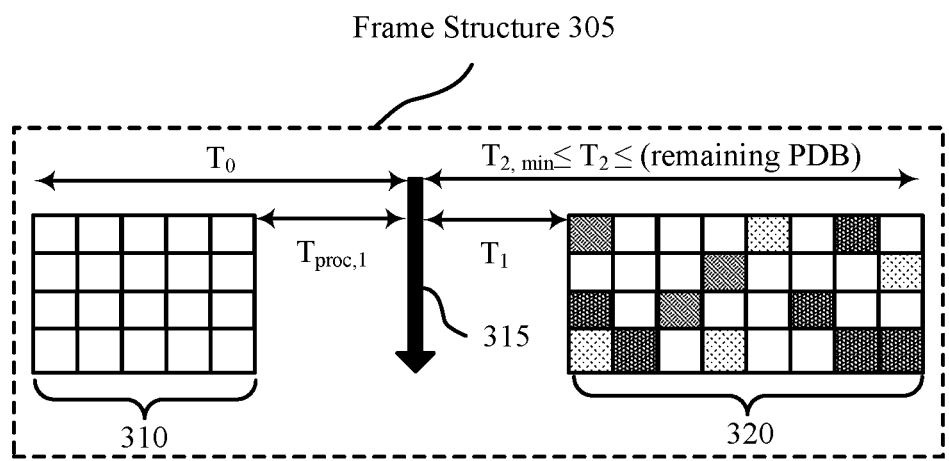
FIGS. 3 and 4 illustrate examples of sensing procedures in accordance with aspects of the present disclosure.

FIG. 3 illustrates an example of a sensing procedure 300 in accordance with various aspects of the present disclosure. In some examples, the sensing procedure 300 may implement aspects of the wireless communications system 100 and the wireless communications system 200, as described in FIGS. 1 and 2. The sensing procedure 300 may be implemented by a UE (e.g., a UE 115) to support resource sensing in a sidelink communications system according to the techniques described herein. For example, the sensing procedure 300 may be performed by a UE according to a channel sensing schedule, where the UE belongs to a group of UEs communicating via sidelink. That is, the sensing procedure 300 may be an example of a portion or subset of a channel sensing schedule configured for multiple UEs, where each UE may perform at least part of the sensing procedure 300 in accordance with a pattern set forth by the channel sensing schedule. Each UE may further share the results of its own sensing procedure performed in a corresponding sensing window.

The sensing procedure 300 may include a resource selection timing 305, which may include a sensing window 310, a resource selection trigger 315, and a resource selection window 320. With reference to FIG. 2, the UE may monitor a control channel (e.g., a sidelink control channel) to receive and decode control signals during the sensing window 310 in accordance with a channel sensing schedule. Upon receiving the resource selection trigger 315 (e.g., a data packet received $T_{proc,1}$ after the resource selection window 320 and $T_1$ before the resource selection window 320), the UE may select and reserve resources 325 within the resource selection window 320 for sidelink communication with another UE. The sensing window 310 may be configured to span a duration $T_0$ as indicated by the channel sensing schedule. For example, the sensing window 310 may span a duration that is different from a duration (e.g., 100 ms or 100+100 ms) of a sensing window associated with operations that exclude the channel sensing schedule.

During the sensing window 310, the UE may perform channel sensing (e.g., sidelink channel sensing) by decoding SCI to identify the occupied or available sidelink resources. For example, the UE may receive SCI from multiple other UEs indicating sidelink resources reserved by the respective UE. Additionally, or alternatively, the UE may determine an RSRP for each resource of the set of resources and may compare the RSRP for each resource with a threshold RSRP. For instance, if the RSRP for a given resource satisfies the threshold, that resource may be considered an available resource. The sensing may be performed by a first layer, such as a PHY layer, of a protocol stack of the UE, for example, by decoding scheduling information included in the SCI(s).

The PHY layer may obtain parameters for performing the channel sensing from a higher protocol stack layer (e.g., second layer) of the UE, such as a MAC layer of the protocol stack. In some cases, channel sensing parameters may be indicated by the channel sensing schedule. For example, the channel sensing schedule may allocate one or more subsets of frequency resources to each UE in the group of UEs. The PHY layer may sense the one or more allocated subsets of frequency resources during the sensing window 310.

It is to be understood that while the examples herein describe a PHY layer and a MAC layer, the same examples may also apply to any other layers of a protocol stack without departing from the scope of the present disclosure. For example, the examples described herein may apply to a PHY layer and an RRC layer, or to a MAC layer and an RRC layer, among other examples. In some cases, for example, a MAC layer may receive information from or report information to other upper layers, such as the RRC layer, which may impact resource selection.

The MAC layer may trigger selection of resources for a sidelink transmission and may, for example, provide a trigger to the PHY layer for the PHY layer to report a resource schedule for the resource selection window 320. The MAC layer may also provide, to the PHY layer, an indication of a sidelink resource pool for resource selection, a priority of the sidelink transmission, a PDB for the sidelink transmission, a number of subchannels for a data channel (e.g., physical sidelink shared channel (PSSCH)) or for a control channel (e.g., physical sidelink control channel (PSCCH)) associated with the sidelink transmission, a resource reservation interval for periodic resource reservation, a threshold percentage of available resources to report, or a length of the sensing window 310, among other examples. The PHY layer may perform a channel sensing procedure during the sensing window 310 to identify available resources based on the parameters indicated by the MAC layer.

When performing sensing to identify available resources, the PHY layer may determine unavailable resources (e.g., determine that resources are occupied) by decoding SCI (e.g., an SCI-1) and comparing an RSRP of the SCI (e.g., or an RSRP of an associated data channel, such as a PSSCH) to an RSRP threshold. The RSRP threshold may be based on a priority of the sidelink transmission and a priority associated with the SCI, among other examples. If the RSRP of the SCI (e.g., or PSSCH) satisfies or exceeds the RSRP threshold, the resources reserved by the SCI may be considered unavailable resources 335 (e.g., occupied resources). If the RSRP of the SCI (e.g., or the PSSCH) fails to meet the RSRP threshold, the resources reserved by the SCI may be considered available resources (e.g., unoccupied resources, such as unoccupied resources 340). Resources not reserved by SCI may also be considered available.

Based on the channel sensing procedure, the UE may determine reserved resources 330 (e.g., from resource reservations indicated in SCI), unavailable resources 335 (e.g., resources that satisfy or exceed the RSRP threshold), and available resources. The UE may select resources 325 from the available resources in one or more time slots of the resource selection window 320. In the example of FIG. 3, the remaining available resources (e.g., excluding the selected resources 325) may be considered unoccupied resources 340. In some cases, the resource selection window 320 may span a duration $T_2$ bound by parameters $T_{2,min}$ and a remaining packet delay budget (PDB). A PDB may be configured by an upper layer of the UE and may indicate a delay budget for a data packet. The remaining PDB may therefore be a remaining amount of time before the data packet received at the resource selection trigger 315 may be transmitted on the selected resources 325.

In other cases, the resource selection window 320 may span a duration $T_2$ that is independent of a PDB. For example, a UE performing channel sensing and resource selection according to a channel sensing schedule may be unaware of PDBs associated with other UEs; thus, the duration $T_2$ may not be related to any PDB. The duration $T_2$ may be fixed (e.g., preconfigured) or may be configured by one or more UEs in the group of UEs. In some examples, the duration $T_2$ may be at least 32 slots (e.g., as associated with an SCI-1 aperiodic reservation). In any case, the selected resources 325 may be reserved in units of subchannels within the resource selection window 320 and may be periodic or aperiodic in a time domain.

Based on the determination of the available resources, the PHY layer may also determine a percentage of resources within the resource selection window that are available (e.g., SL-xPercentage). The PHY layer may compare the percentage of available resources with a threshold percentage provided by the MAC layer. In some examples, the threshold percentage may be determined or otherwise configured by the UE or a number of UEs of the group of UEs. If the percentage of available resources does not meet the threshold percentage provided by the MAC layer (e.g., SL-xPercentage), the PHY layer may increase the RSRP thresholds associated with the received SCI (e.g., may increase each threshold by 3 decibels (dB)) and may determine new available resources in the resource selection window 320 based on the increased RSRP thresholds. If the percentage of available resources still does not meet the threshold percentage provided by the MAC layer (e.g., SL-xPercentage), PHY layer may further increase the RSRP thresholds (e.g., by 3 dB), and this process may be repeated until meeting the threshold percentage for the available resources.

Upon identifying or determining an amount of available resources that satisfies (e.g., meets or exceeds) the threshold percentage, the PHY layer may report the available resources (e.g., report a set of resources) to the MAC layer. The MAC layer may create a sidelink grant (e.g., may reserve the selected resources 325 for the sidelink transmission) based on the report of the available resources from the PHY layer. For example, the MAC layer may randomly select resources 325 from the available resources for an initial transmission of the sidelink transmission and for retransmissions of the sidelink transmission. The MAC layer may select resources 325 for the sidelink transmission such that the resources may be addressed by a time domain resource allocation (TDRA) field and a frequency domain resource allocation (FDRA) field of an SCI. The MAC layer may also select the resources 325 such that a time gap (e.g., a defined time gap, such as a minimum time gap) exists between retransmissions for HARQ processes (e.g., if HARQ is enabled). For periodic transmissions, the MAC layer may also trigger reselection of periodic resources, for example, based on expiration of a timer or based on reaching a count value with a counter. The MAC layer may provide the selected resources 325 (e.g., a resource grant) to the PHY layer. The PHY layer may transmit SCI that may schedule or reserved the selected resources 325.

According to the techniques described herein, the UE may transmit a message indicating results of the channel sensing procedure (e.g., resource information) to one or more other UEs based on the channel sensing schedule. For example, the UE may perform SCI-1 forwarding, where the message may include resource information such as reservations detected in the resource selection window 320. In some cases, the message may include an index of the resources in the resource selection window 320, an indication of resource reservations indicated by the decoded SCI, an indication of which resources sensed by the UE are reserved resources 330, an indication of the selected resources 325 that have been reserved by the UE, or the like, or some combination thereof. If the UE performed RSRP measurements for the resources during the sensing window 310, the message may include an indication of RSRP values, such as an RSRP for some or all of the resources of the set of resources sensed by the UE. Additionally, or alternatively, the message may include an indication of the RSRP threshold and/or a percentage of candidate resources. In some aspects, the message may further include an indication of unavailable resources 335 (e.g., based on the RSRP measurements and/or RSRP threshold), an indication of unoccupied resources 340 (e.g., candidate resources), or some combination thereof.

As an example, the message may include a bitmap of the resource selection window 320, where each bit corresponds to a resource. In such an example, the UE may use a bit to indicate whether a resource is occupied or unoccupied. The UE may reduce the number of bits used in the message by compressing the bitmap. In another example, the message may include a location of occupied resources, a location of unoccupied resources, an RSRP value corresponding to each location, or the like.

A UE receiving the message indicating the sensing results may select resources to use for sidelink communications based on the resource information. For instance, the receiving UE may identify resources during a resource selection window based on the message and may select resources from the indicated candidate resources (e.g., unoccupied resources 340). The UE may operate in a transmission mode in order to transmit one or more sidelink messages on the selected resources.

Figure 4:
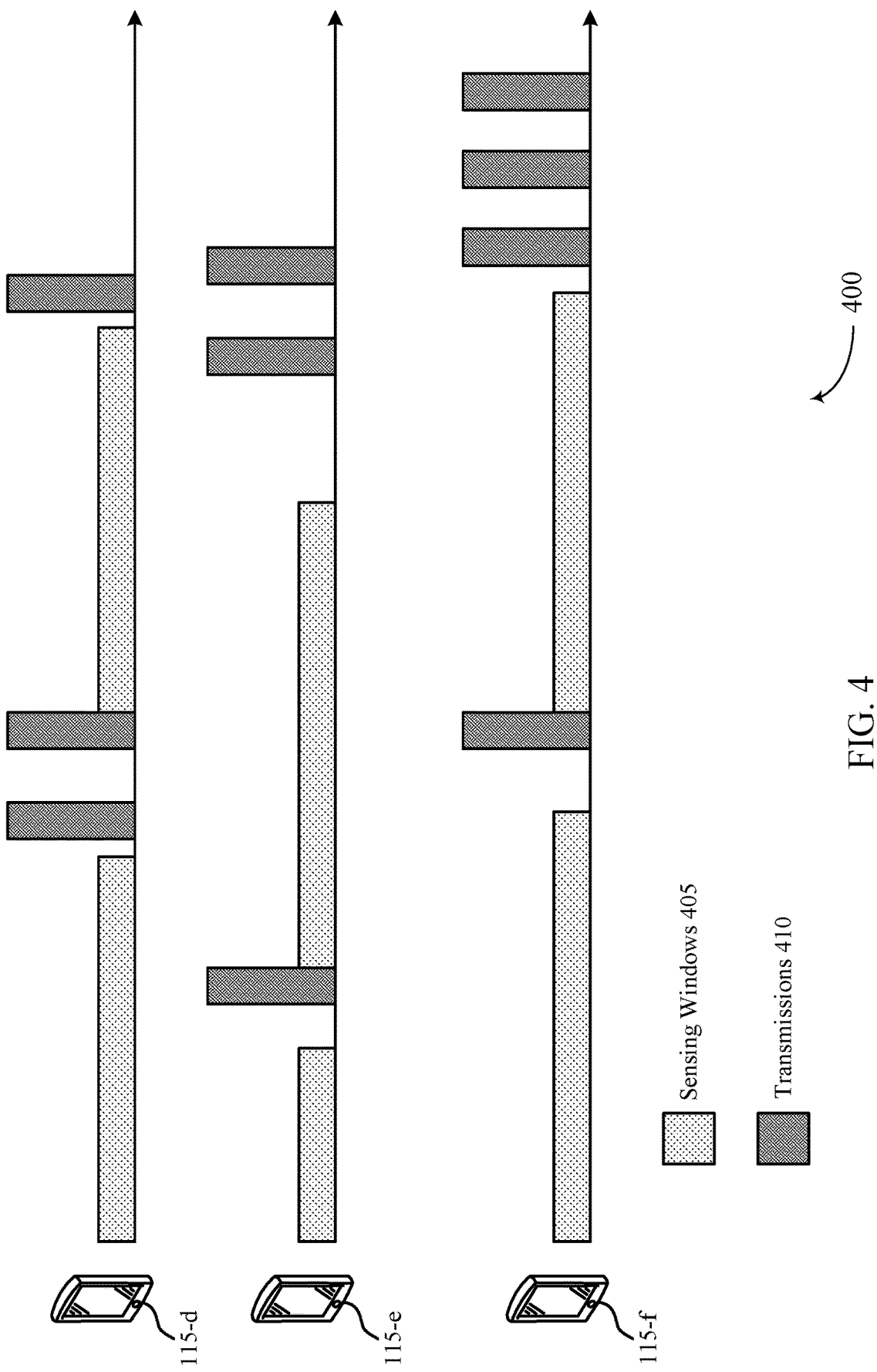

FIG. 4 illustrates an example of a sensing procedure 400 in accordance with aspects of the present disclosure. In some examples, the sensing procedure 400 may implement aspects of the wireless communications system 100 and the wireless communications system 200, as described in FIGS. 1 and 2. The sensing procedure 400 may be implemented by UEs 115-d, 115-e, and 115-f, which may be examples of corresponding devices described herein, to perform resource sensing in a sidelink communications system in accordance with aspects of the present disclosure.

The UEs 115-d, 115-e, and 115-f may form or belong to a same group, for example, based on a location of the UEs 115, a proximity of the UEs 115, or the like, and may communicate with one another (e.g., and with any other UEs 115 in the same group) via sidelink communications. The UEs 115 may operate in a mode 2 and may therefore each self-select resources to use for sidelink transmissions, such as transmissions 410. For example, with reference to FIG. 3, the UE 115-d may perform channel sensing (e.g., a sensing procedure) during a first sensing window 405 and may select resources from a resource pool to use for a first transmission 410. The UE 115-e may perform channel sensing during a second sensing window 405 that may overlap in time with the first sensing window 405 and may select resources to use for a second transmission 410. Additionally, the UE 115-f may perform channel sensing during a third sensing window 405 that overlaps in time with the first sensing window 405 and the second sensing window 405, and may select resources to use for a third transmission 410.

The UEs 115 may perform channel sensing during respective sensing windows 405 before any transmission 410. For instance, the UE 115-d may transmit two transmissions 410 on resources selected from the first sensing window 405, and may then perform channel sensing during an additional sensing window 405 to select resources for a third transmission 410. The UE 115-e and the UE 115-d may also perform channel sensing during respective additional sensing windows 405 to select resources for additional transmissions.

However, because the UEs 115 belong to a same group (e.g., and may be in close proximity to one another), the resource pool from which each UE 115 senses and selects resources may be substantially the same. Additionally, as illustrated in FIG. 4, the UEs 115 may perform channel sensing during sensing windows 405 that overlap in time. Thus, the results of the sensing procedures performed by each UE 115 in the example of FIG. 4 may also be substantially the same. Accordingly, the UEs 115 may consume significant power to perform respective channel sensing procedures only to achieve the same results.

According to the techniques described herein, the UEs 115 may avoid wasting power and duplicating sensing efforts across devices by performing collaborative sensing and sharing according to a channel sensing schedule. As described with more detail in reference to FIGS. 5 and 6, the UEs 115 (e.g., UEs 115-d, 115-e, and 115-f) may take turns performing channel sensing during sensing windows 405 that are offset in the time domain or have different periodicities and/or durations. Additionally or alternatively, the UEs 115 may each sense a subset of frequency resources. The UEs 115 may share sensing results with one another via sidelink transmissions including resource information, thereby enabling a UE 115 to select resources while performing fewer overall sensing procedures and reducing power consumption by an amount corresponding to the number of UEs 115 in the group (i.e., the number of UEs performing collaborative sensing). In other words, each UE 115 may reduce power consumption by a factor of 1/N, where N is the number of UEs 115 in the group. In the example of FIG. 4, as there are three UEs 115 in the group, each UE 115 may reduce power consumption by a factor of ⅓.

Figure 5:
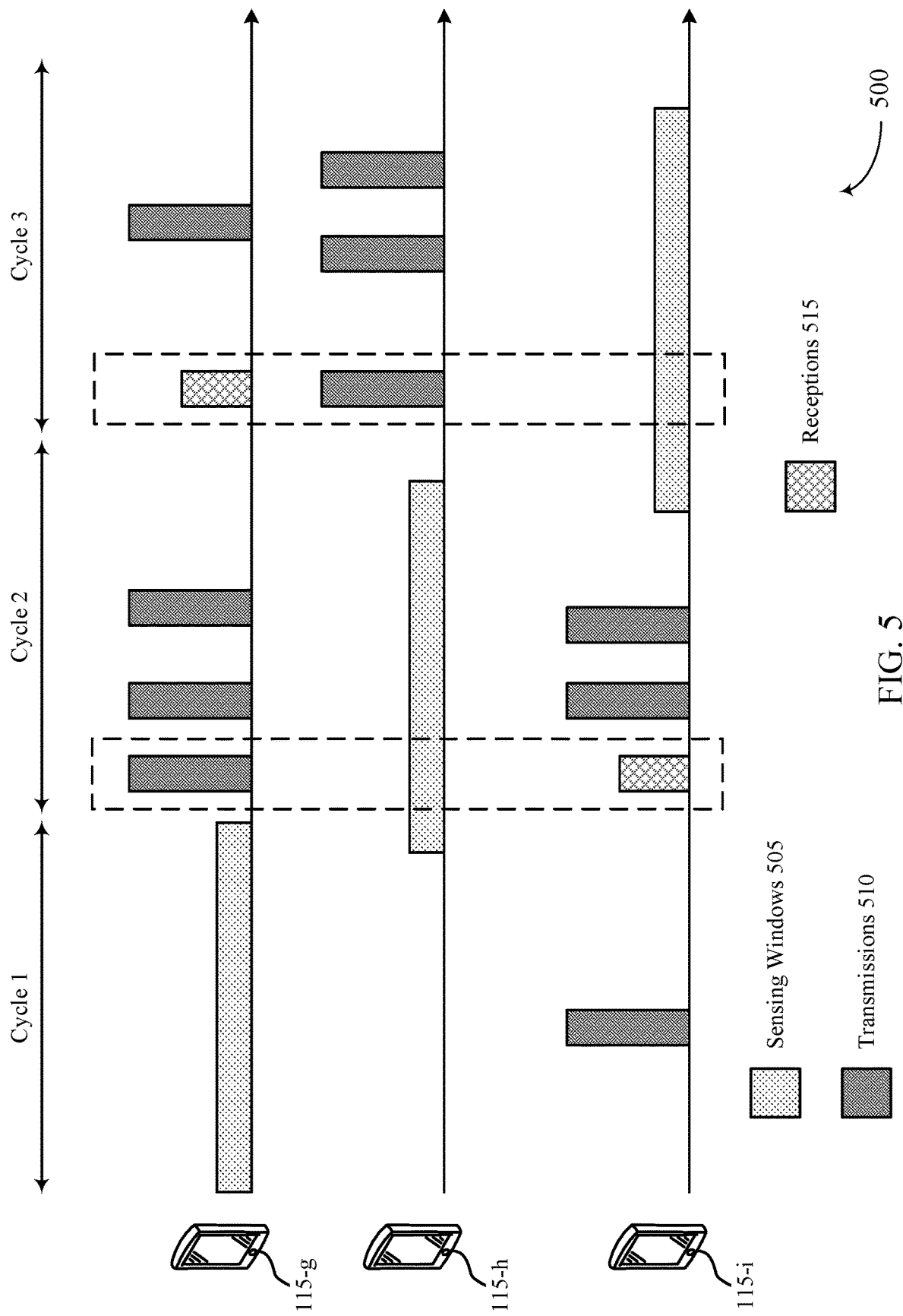
FIGS. 5 and 6 illustrate examples of channel sensing schedules in accordance with aspects of the present disclosure.

FIG. 5 illustrates an example of a channel sensing schedule 500 in accordance with aspects of the present disclosure. The channel sensing schedule 500 may implement aspects of the wireless communications systems 100 and 200 as described in FIGS. 1 and 2, respectively. The channel sensing schedule may be implemented by UEs 115-g, 115-h, and 115-i, which may be examples of corresponding devices described herein, to perform resource sensing in a sidelink communications system in accordance with aspects of the present disclosure.

The UEs 115-g, 115-h, and 115-i may form or belong to a same group, for example, based on a location of the UEs 115, a proximity of the UEs 115, or the like, and may communicate with one another (e.g., and with any other UEs 115 in the same group) via a sidelink communication link. The UEs 115 may each self-select resources to use for sidelink transmissions. As described with reference to FIGS. 2 and 3, one or more of the UEs 115 may collaborate (e.g., negotiate) to configure the channel sensing schedule 500, for instance, based on capabilities of the UEs 115, traffic loads of the UEs 115, etc. The channel sensing schedule 500 may include a number of cycles, where each cycle may include a sensing window 505 in accordance with a pattern. For example, each sensing window 505 may have a respective duration, periodicity, or the like. The UEs 115 may identify the configured channel sensing schedule and the associated sensing windows 505 (e.g., and any associated parameters, such as durations, etc.). The UEs 115 may perform channel sensing during a cycle in an associated sensing window 505 according to the channel sensing schedule. Based on the channel sensing, a UE 115 may transmit a message including sensing results to the other UEs 115. A UE 115 receiving the message may determine and select available resources according to the sensing results.

In the example of the channel sensing schedule 500 illustrated in FIG. 5, the UE 115-g may perform channel sensing in a first sensing window 505 during Cycle 1. The UE 115-g may sense a set of resources of the sidelink communication link as described with reference to FIGS. 2 and 3, for instance, by decoding SCI, performing RSRP measurements, or the like. Based on the sensing, the UE 115-g may identify candidate resources and may select and/or reserve resources from the candidate resources to use for a sidelink transmission. In some examples, while a UE 115 is not performing sensing, the UE 115 may operate in a power saving mode or a transmission mode. For example, during the first sensing window 505, the UE 115-h may operate in a power saving mode to conserve power while the UE 115-g is performing channel sensing. Alternatively, the UE 115-i may operate in a transmission mode during the first sensing window 505.

At the end of Cycle 1, based on the channel sensing schedule 500, UE 115-i may begin channel sensing during a second sensing window 505. The second sensing window 505 may partially overlap in time with the first sensing window 505. In some examples, overlapping sensing windows in the time domain during a transition between cycles may reduce the likelihood of missing reservation information transmitted during the transition. At the beginning of Cycle 2, during the second sensing window 505, the UE 115-g may transmit a message (e.g., a transmission 510) including the sensing results to the UEs 115-h and 115-i. The message may include resource information as described herein with reference to FIG. 3. While the UE 115-h may be performing sensing, the UE 115-i may receive the message (e.g., a reception 515) and may identify candidate resources based on the resource information and sensing results. That is, the transmission of the message by UE 115-g, the reception of the message by UE 115-i, and the channel sensing performed by UE 115-h may all occur at a same time (e.g., may all overlap in the time domain). Thus, the UEs 115-g, 115-h, and 115-i may collaboratively perform sensing procedures and share sensing results, thereby reducing power consumption as compared to the UEs 115-d, 115-e, and 115-f described with reference to FIG. 4.

Based on the resource information included in the message, during Cycle 2, the UE 115-i may subsequently select resources from the candidate resources and may transmit one or more sidelink transmissions (e.g., transmissions 510). In some cases, the identification and selection of resources performed by the UE 115-i may occur during a resource selection window (e.g., as described with reference to FIG. 3) based on the channel sensing schedule. In some examples, the UE 115-i may select resources from the candidate resources during the resource selection window according to instructions indicated in the message (e.g., instructions from the UE 115-g). Additionally, during Cycle 2, the UE 115-g may select resources based on the channel sensing performed during the first sensing window 505 and may transmit other transmissions 510 on the selected resources.

In some examples, a UE 115 that selects resources from the candidate resources may do so according to one or more methods or techniques, such as one or more methods or techniques negotiated between the UEs 115 (e.g., during formation of the group). As an example, one techniques may include randomly selecting resources based on an algorithm common to all UEs 115 of the group, where each UE 115 is given a seed (e.g., a random number) with which the respective UE 115 may perform the random selection. Such techniques may reduce the likelihood that two UEs 115 that are selecting resources during the same resource selection window select the same resources. In one example, the UE 115-i and the UE 115-g may randomly select resources during the resource selection window using a respective seed, which may enable the UE 115-i and the UE 115-g to avoid selecting the same resources.

In some cases, a UE 115 that selects resources from the candidate resources may do so according to a resource limit, such as a maximum percentage of available resources of the resource selection window (e.g., congestion control). That is, a UE 115 (e.g., the UE 115-i) may select a number of resources from the candidate resources, where the number of resources satisfies a threshold percentage of the available resources in the resource selection window that one UE 115 may select. The threshold percentage may be indicated by a sensing UE 115 (e.g., the UE 115-g in the example of Cycle 2) or a master UE 115 (e.g., a master UE 115 of the group). In some cases, the threshold percentage may be determined via negotiation, for example, during formation of the group. In some examples, the threshold percentage may be determined dynamically, for instance, where the group may renegotiate (e.g., after group formation) the threshold percentage (e.g., or other parameters) based on traffic at one or more UEs 115, priority of the traffic at one or more UEs 115, or the like.

At the end of Cycle 2, the UE 115-i may begin channel sensing during a third sensing window 505 that may overlap in time with the second sensing window 505. At the beginning of Cycle 3, the UE 115-h may transmit a message (e.g., a transmission 510) indicating sensing results, which the UE 115-g may receive (e.g., a reception 515) and use to determine candidate resources. Again, the transmission of the message by the UE 115-h, the reception of the message by the UE 115-g, and the channel sensing performed by the UE 115-i may occur at the same time. The UE 115-g may subsequently select resources based on the indicated sensing results and may transmit one or more sidelink transmissions (e.g., transmissions 510) on the selected resources during Cycle 3. The UE 115-h may also select resources for transmissions 510 based on the sensing results.

It is noted that the example channel sensing schedule 500 is one example of a schedule or pattern used by multiple UE's 115 for collaborative sensing procedures, and other examples are possible. For example, some channel sensing schedules may include more or different sensing windows 505, which may be based on a number of UEs 115 collaboratively sensing a channel or sub-channels of a sidelink or other factors. Likewise, some different number of cycles may be used for various channel sensing schedules. Thus, the examples described herein are provided for illustrative purposes and should not be considered limiting as the same or similar techniques may apply to or be used in other cases not explicitly mentioned.

Figure 6:
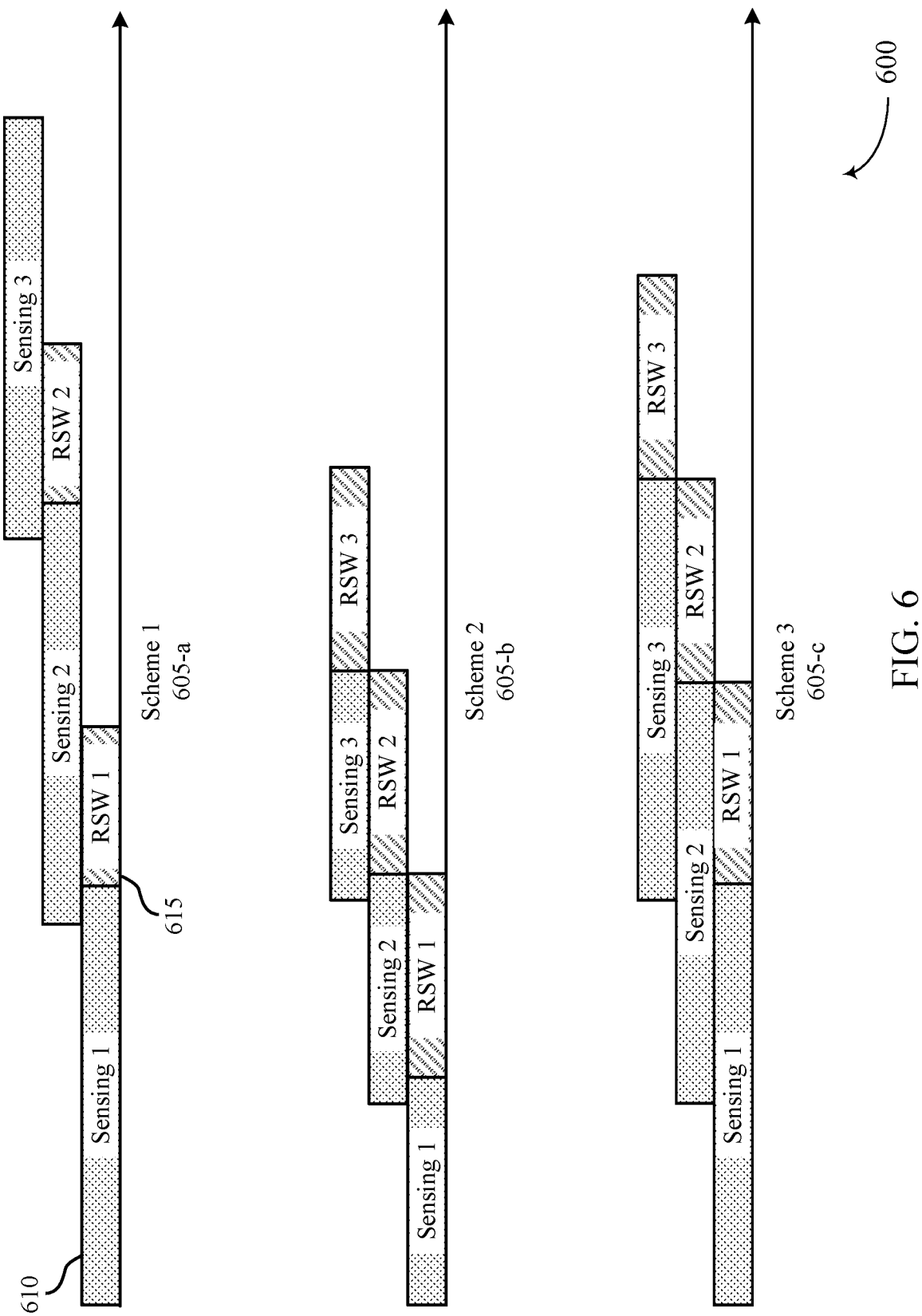

FIG. 6 illustrates an example of a channel sensing schedule 600 in accordance with aspects of the present disclosure. The channel sensing schedule 600 may implement aspects of the wireless communications systems 100 and 200 as described in FIGS. 1 and 2, respectively. For example, the channel sensing schedule may be implemented by a group of UEs (e.g., UEs 115) to perform resource sensing in a sidelink communications system in accordance with aspects of the present disclosure.

The channel sensing schedule 600 may include a first scheme 605-a (e.g., scheme 1), a second scheme 605-b (e.g., scheme 2), and a third scheme 605-c (e.g., scheme 3). Each scheme 605 may include a sensing window 610 and a resource selection window (RSW) 615 that correspond to a UE. For example, the first scheme 605-a includes a first sensing window 610 and a first resource selection window 615 corresponding to a first UE, a second sensing window 610 and a second resource selection window 615 corresponding to a second UE, and a third sensing window 610 (and a third resource selection window 615, not shown) corresponding to a third UE. The second scheme 605-b and the third scheme 605-c may likewise include a first sensing window 610 and a first resource selection window 615 corresponding to a first UE, a second sensing window 610 and a second resource selection window 615 corresponding to a second UE, and a third sensing window 610 and a third resource selection window 615 corresponding to a third UE.

The first scheme 605-a, the second scheme 605-b, and the third scheme 605-c illustrate patterns of sensing windows 610 and resource selection windows 615 that may be established by a channel sensing schedule (e.g., channel sensing schedule 600). In some examples, the channel sensing schedule (e.g., channel sensing schedule 600) may include the first scheme 605-a, or the second scheme 605-b, or the third scheme 605-c, or some other scheme 605, or any combination thereof. For instance, a channel sensing schedule may include a pattern of continuous sensing windows 610 and discontinues resource selection windows 615, as exemplified in the first scheme 605-*a*. That is, UEs operating according to the first scheme 605-*a* may perform sensing during sensing windows 610 that are continuous in the time domain, but may perform resource selection during resource selection windows 615 that are discontinuous in the time domain. Continuous sensing windows 610 may enable relatively more reliable and accurate decoding of SCIs and, consequentially, detection of reservations indicated by SCIs. Discontinuous resource selection windows 615 may limit transmission time and/or transmission opportunities for a UE, but may enable the UE(s) to operate in a power saving mode for a longer duration, as the UE may wake less often to perform resource selection and transmission.

The second scheme 605-*b* illustrates a pattern of continuous sensing windows 610 and continuous resource selection windows 615. In the second scheme 605-*b*, sensing windows 610 may have a relatively shorter duration (e.g., as compared to the first scheme 605-*a* or the third scheme 605-*c*), which may enable continuous resource selection windows 615. UEs operating according to the second scheme 605-*b* may therefore be capable of supporting low-latency traffic, as the UEs may sense and select resources more frequently (e.g., than the first scheme 605-*a* or the third scheme 605-*c*).

In the third scheme 605-*c*, two or more sensing windows 610 may be staggered and resource selection windows 615 may be continuous. As illustrated, the sensing windows 610 may overlap in the time domain (e.g., may overlap more as compared to the first scheme 605-*a*), which may enable UEs to more accurately perform channel sensing and detection of SCI. The third scheme 605-*c* further enables continuous resource selection windows 615, which may provide more frequent transmission opportunities.

A channel sensing schedule (e.g., channel sensing schedule 600) may establish patterns for sensing windows 610 and resource selection windows 615 associated with each UE of the group of UEs. For example, one or more of the schemes 605 described with reference to FIG. 3 may be configured (e.g., negotiated) between the UEs that use the channel sensing schedule 600 and corresponding pattern(s) set forth by the channel sensing schedule 600. Here, one or more UEs may signal its preference or request to use, for example, second scheme 605-*b*, which may be based on a type or quantity of the UE's communications over a sidelink communication link, or based on other factors. In such cases, the other UEs participating in the collaborative sensing may provide feedback to the UE's indication of the preferred or requested scheme 605, and the group of UEs may determine at least one scheme 605 (or may determine various parameters associated with one or more schemes 605) that is suitable for each UE's communications conditions, power savings conditions, capabilities, or other operational aspects. The patterns provided by the channel sensing schedule 600 may include, but are not limited to, those illustrated in the first scheme 605-*a*, the second scheme 605-*b*, and the third scheme 605-*c*, or a combination thereof. For instance, the pattern may include sensing windows that overlap in the time domain or are continuous or discontinuous in the time domain, resource selection windows 615 that overlap in the time domain or are continuous or discontinuous in the time domain, etc. In some examples, the UEs may determine to modify a particular scheme 605 or switch between different schemes. As an example, UE's participating in collaborative channel sensing may determine to switch from using a first scheme (e.g., first scheme 605-*a*) and a second, different scheme (e.g., third scheme 605-*c*). The modification of the scheme 605 used may be based on a request from one or more UEs, where the request may be based on a UE's power savings parameters, traffic profile, or the like.

The pattern may further be established by durations of the sensing windows 610 and resource selection windows 615. For example, sensing windows in first scheme 605-*a* may have a longer duration than sensing windows in second scheme 605-*b*. In some cases, the pattern may also include subsets of frequency resources for sensing, where each UE of the group of UEs senses a subset of frequency resources during a sensing window 610.

Figure 7:
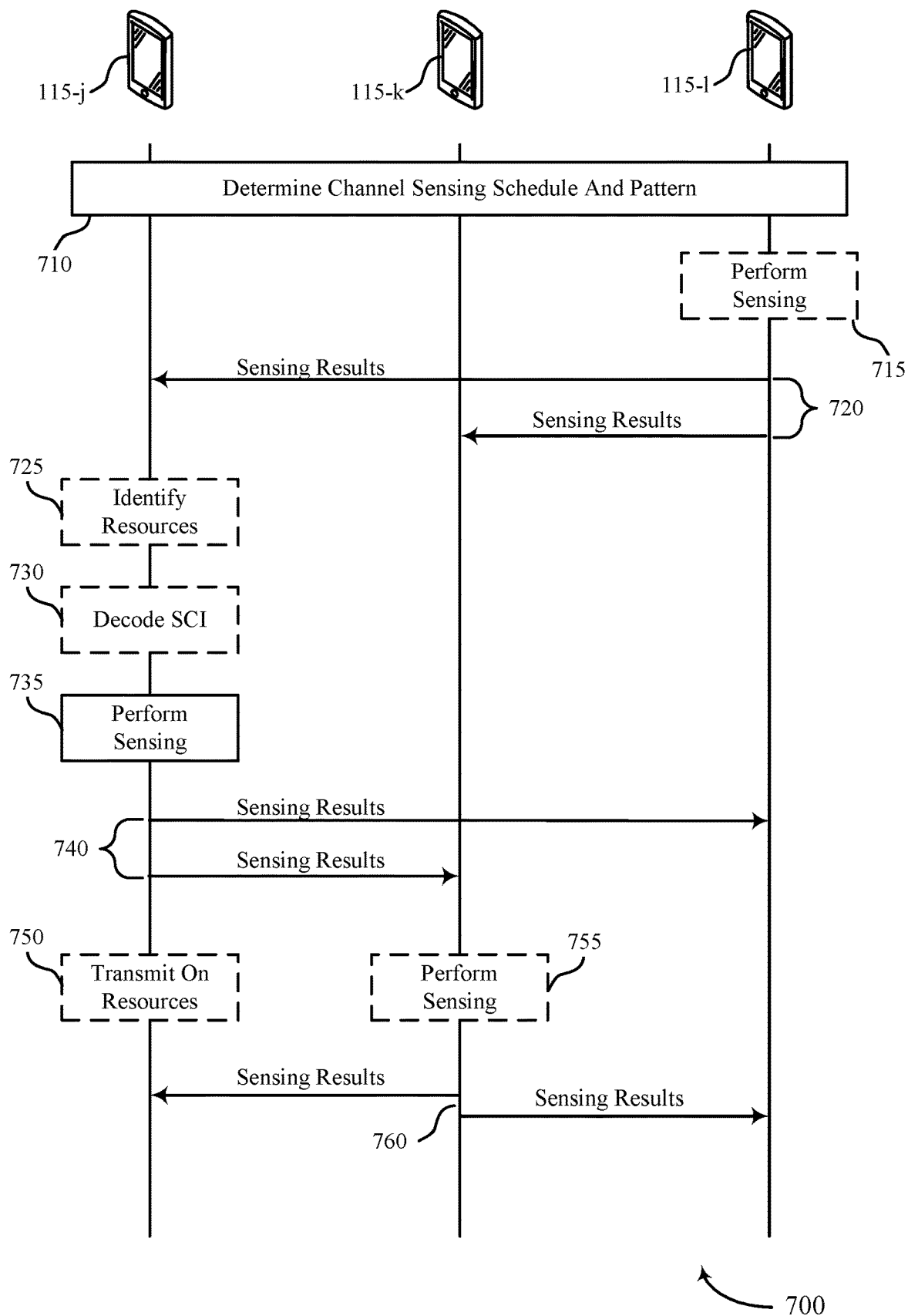
FIG. 7 illustrates an example of a process flow in accordance with aspects of the present disclosure.

FIG. 7 illustrates an example of a process flow 700 in accordance with aspects of the present disclosure. In some examples, the process flow 700 may implement aspects of wireless communications systems 100 or 200. For example, process flow 700 may include UE 115-*j*, UE 115-*k*, and UE 115-*l*, which may be examples of corresponding wireless devices as described herein. In the following description of the process flow 700, the operations between the UEs 115 may be transmitted in a different order than the exemplary order shown, or the operations performed by the UEs 115 may be performed in different orders or at different times. Certain operations may also be left out of the process flow 700, or other operations may be added to the process flow 700. It is to be understood that while the UEs 115 are shown performing operations of process flow 700, any wireless device may perform the operations shown.

At 710, the UEs 115 may identify a channel sensing schedule and associated pattern for sensing a set of resources of a sidelink channel over which the UEs 115 may communicate. In some examples, at 710, one or more of the UEs 115 may negotiate and/or configure the channel sensing schedule. In some cases, one or more of the UEs 115 may transmit a message indicating preferred parameters, capabilities, or traffic conditions (e.g., data traffic conditions) that may influence the configuration of the channel sensing schedule. For example, the UE 115-*k* may transmit a message to the UEs 115-*j* and 115-*l* indicating a traffic load and a capability of the UE 115-*k*. The UE 115-*l* may transmit a message to the UE 115-*j* and the UE 115-*k* indicating a traffic load of the UE 115-*l*. The UE 115-*j* may be a master UE 115-*j* and may configure the channel sensing schedule based on the messages received from the UE 115-*k* and the UE 115-*l*. The channel sensing schedule may include a pattern for a first sensing window associated with the UE 115-*j*, a second sensing window associated with the UE 115-*k*, and a third sensing window associated with the UE 115-*l*.

In some examples, at 710, the UEs 115 may identify and/or configure durations of the sensing windows based on the channel sensing schedule and the associated pattern. For instance, the UEs 115 may identify a first duration of the first sensing window, a second duration of the second sensing window, and a third duration of the third sensing window.

In some cases, at 710, the UEs 115 may determine one or more subsets of frequency resources associated with the channel sensing schedule. For instance, the UE 115-*j* may identify a first subset of frequency resources to be sensed during the first sensing window, the UE 115-*k* may identify a second subset of frequency resources to be sensed during the second sensing window, and the UE 115-*l* may identify a third subset of frequency resources to be sensed during the third sensing window.

At 715, according to the pattern established by the channel sensing schedule, the UE 115-*l* may perform sensing of a set of resources during the third sensing window. For example, the UE 115-*l* may sense the associated subset of frequency resources as determined at 710. In some examples, the UE 115-*l* may decode SCI received on the sidelink communication link and the sensing may be performed based on one or more resource reservations indicated by the decoded SCI. In some cases, the UE 115-*l* may measure RSRPs for the resources or may determine an RSRP threshold that provides a percentage of candidate resources in resource selection window (e.g., based on decoding the sidelink information received on the sidelink communication link). In some examples, the RSRP threshold and/or the percentage of candidate resources may be configured by one or more of the UEs 115, e.g., at 710.

At 720, the UE 115-*l* may transmit, and the UE 115-*k* and the UE 115-*k* may receive, a message indicating results of the sensing performed at 715. The message may include an indication of the RSRP threshold, the percentage of candidate resources, or both. Additionally or alternatively, the message may include resource information, e.g., from the decoded SCI. For instance, the resource information may include an indication of an RSRP for each resource of the set of resources, an indication of reserved resources (e.g., based on the resource reservations), an indication of the candidate resources, or some combination thereof. In some cases, the message may include or exclude one or more RSRP values based on the sensing performed at 715.

At 725, the UE 115-*j* may identify one or more candidate resources from the set of resources during a resource selection window, where the candidate resources may be identified based on the message received at 720. In some examples, the resource selection window may have a duration established by the pattern of the channel sensing schedule.

At 730, the UE 115-*j* may receive, over the sidelink communication link, and decode SCI.

At 735, the UE 115-*j* may perform sensing during the first sensing window according to the channel sensing schedule and pattern. For example, the UE 115-*j* may sense the associated subset of frequency resources as determined at 710. In some examples, the UE 115-*j* may perform the sensing based on one or more resource reservations indicated by the SCI decoded at 730. In some cases, the UE 115-*j* may measure RSRPs for the resources or may determine an RSRP threshold that provides a percentage of candidate resources in resource selection window (e.g., based on decoding the sidelink information received on the sidelink communication link). In some examples, the RSRP threshold and/or the percentage of candidate resources may be configured by one or more of the UEs 115, e.g., at 710, or indicated in the message received at 720.

At 740, the UE 115-*j* may transmit, and the UE 115-*k* and the UE 115-*l* may receive, a message indicating results of the sensing performed at 735 (e.g., during the first sensing window). The message may include an indication of the RSRP threshold, the percentage of candidate resources, or both. Additionally or alternatively, the message may include resource information, e.g., from the SCI decoded at 730. For instance, the resource information may include an indication of an RSRP for each resource of the set of resources, an indication of reserved resources (e.g., based on the resource reservations), an indication of the candidate resources, or some combination thereof. In some cases, the message may include or exclude one or more RSRP values based on the sensing performed at 735.

At 750, the UE 115-*j* may operate in a transmission mode and may transmit one or more messages on the sidelink communication link. The one or more messages may be transmitted on resources selected from the candidate resources during the resource selection window at 725. In some examples, the resources may be selected based on the sensing performed at 735.

At 755, the UE 115-*k* may perform sensing during the second sensing window according to the channel sensing schedule and pattern. For example, the UE 115-*k* may sense the associated subset of frequency resources as determined at 710. In some examples, the UE 115-*k* may perform the sensing based on one or more resource reservations indicated by the SCI decoded at 730. In some cases, the UE 115-*k* may measure RSRPs for the resources or may determine an RSRP threshold that provides a percentage of candidate resources in resource selection window (e.g., based on decoding the sidelink information received on the sidelink communication link). In some examples, the RSRP threshold and/or the percentage of candidate resources may be configured by one or more of the UEs 115, e.g., at 710, or indicated in the message received at 720 or the message received at 740.

In some examples, the transmission performed by the UE 115-*j* at 750 and the sensing performed by the UE 115-*k* during the second sensing window at 755 may overlap in the time domain. Additionally or alternatively, during the second sensing window, the UE 115-*l* may operate in a power saving mode.

At 760, the UE 115-*k* may transmit, and the UE 115-*j* and the UE 115-*l* may receive, a message indicating results of the sensing performed at 755 (e.g., during the first sensing window). The message may include an indication of the RSRP threshold, the percentage of candidate resources, or both. Additionally or alternatively, the message may include resource information, e.g., from a decoded SCI received over the sidelink communication link. For instance, the resource information may include an indication of an RSRP for each resource of the set of resources, an indication of reserved resources (e.g., based on the resource reservations), an indication of the candidate resources, or some combination thereof. In some cases, the message may include or exclude one or more RSRP values based on the sensing performed at 755.

Figure 8:
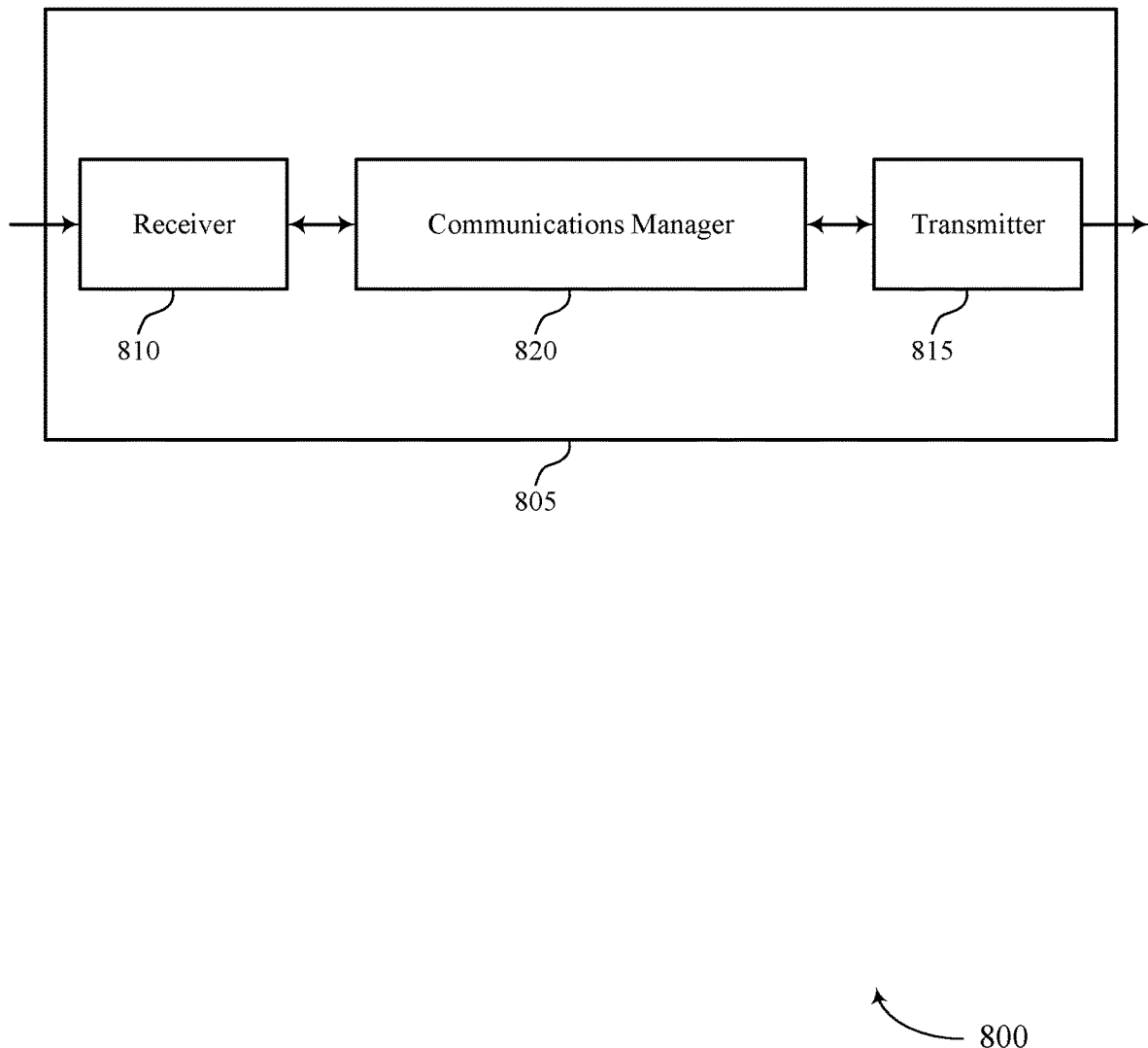
FIGS. 8 and 9 show block diagrams of devices in accordance with aspects of the present disclosure.

FIG. 8 shows a block diagram 800 of a device 805 in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to collaborative sensing and sharing for sidelink communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to collaborative sensing and sharing for sidelink communications). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of collaborative sensing and sharing for sidelink communications as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. For example, the communications manager 820 may be configured as or otherwise support a means for identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The communications manager 820 may be configured as or otherwise support a means for performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for performing collaborative channel sensing and sharing according to a channel sensing schedule. The channel sensing schedule may enable the device 805 to select resources for sidelink transmissions based on results of sensing procedures performed by other devices. The device 805 may therefore decrease power consumption and increase battery life, as the device 805 may reduce a number of channel sensing procedures performed by the device 805 and, in turn, increase the amount of time spent in a power saving mode.

Figure 9:
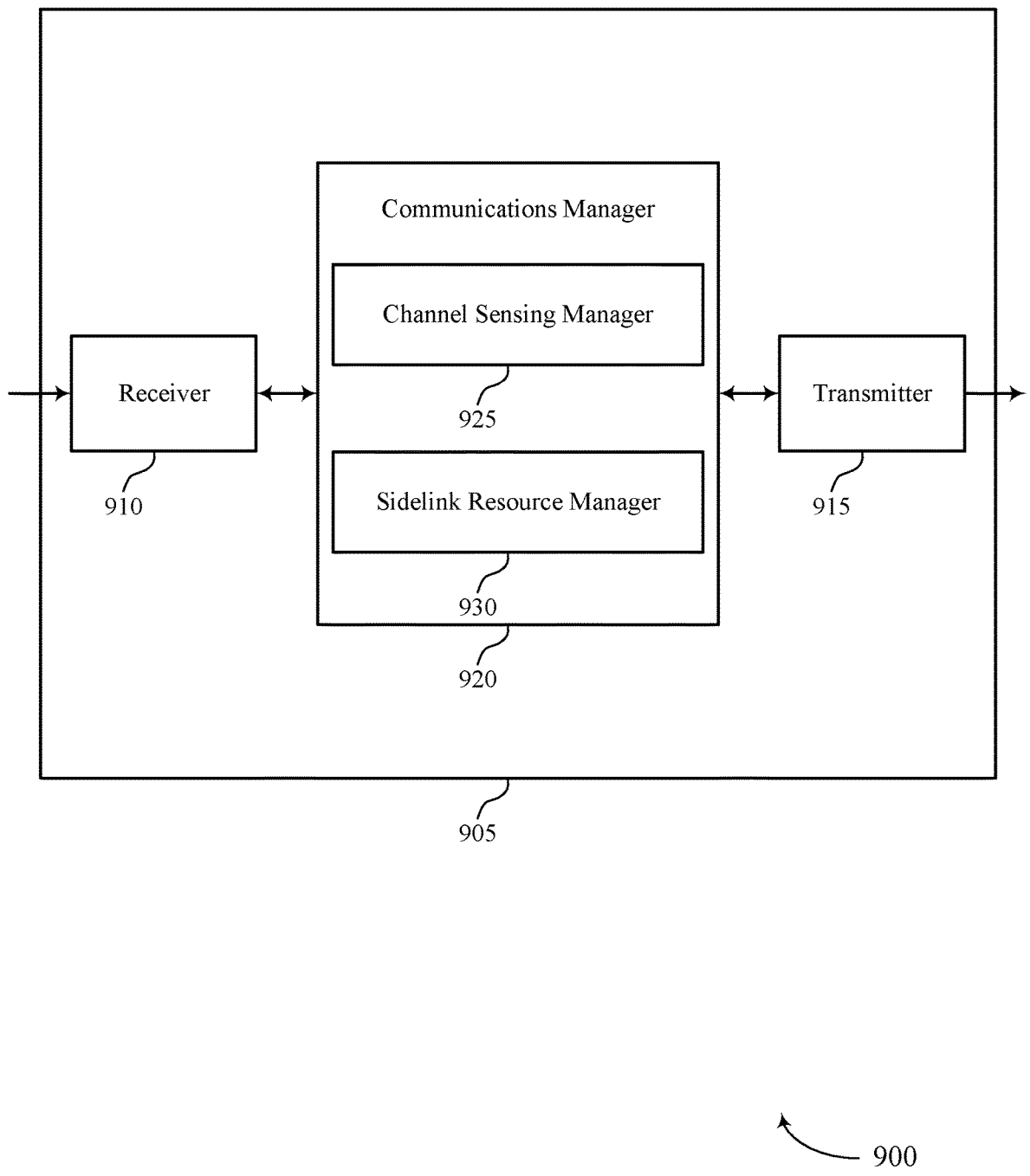

FIG. 9 shows a block diagram 900 of a device 905 in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to collaborative sensing and sharing for sidelink communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to collaborative sensing and sharing for sidelink communications). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of collaborative sensing and sharing for sidelink communications as described herein. For example, the communications manager 920 may include a channel sensing manager 925 a sidelink resource manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a first UE in accordance with examples as disclosed herein. The channel sensing manager 925 may be configured as or otherwise support a means for identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The sidelink resource manager 930 may be configured as or otherwise support a means for performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

Figure 10:
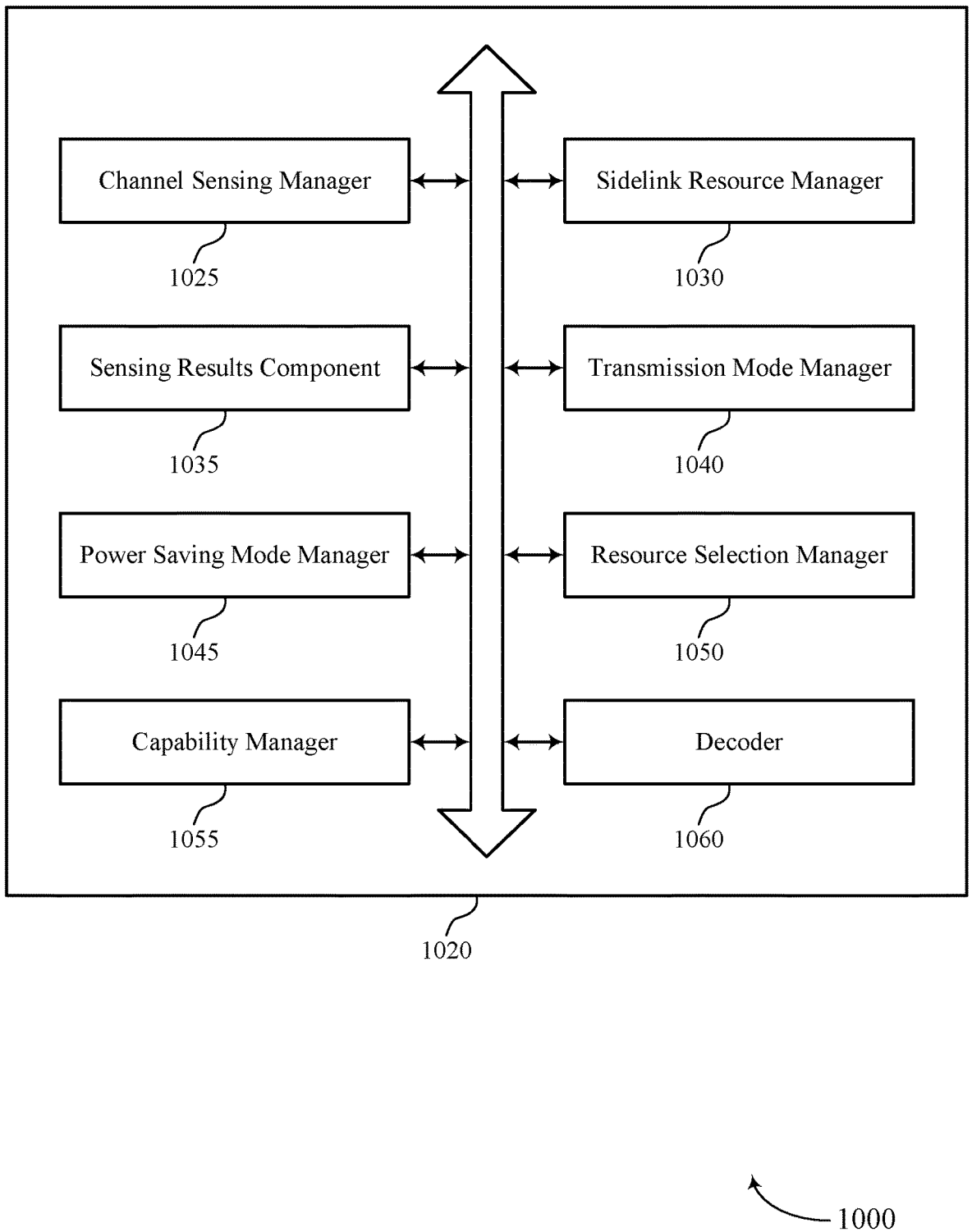
FIG. 10 shows a block diagram of a communications manager in accordance with aspects of the present disclosure.

FIG. 10 shows a block diagram 1000 of a communications manager 1020 in accordance with aspects of the present disclosure. The communications manager 1020 may be an example of aspects of a communications manager 820, a communications manager 920, or both, as described herein. The communications manager 1020, or various components thereof, may be an example of means for performing various aspects of collaborative sensing and sharing for sidelink communications as described herein. For example, the communications manager 1020 may include a channel sensing manager 1025, a sidelink resource manager 1030, a sensing results component 1035, a transmission mode manager 1040, a power saving mode manager 1045, a resource selection manager 1050, a capability manager 1055, a decoder 1060, or any combination thereof. Each of these components may communicate, directly or indirectly, with one another (e.g., via one or more buses).

The communications manager 1020 may support wireless communication at a first UE in accordance with examples as disclosed herein. The channel sensing manager 1025 may be configured as or otherwise support a means for identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The sidelink resource manager 1030 may be configured as or otherwise support a means for performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

In some examples, the sensing results component 1035 may be configured as or otherwise support a means for transmitting, to the set of multiple UEs, a message indicating sensing results based on sensing the set of resources during the first sensing window and the channel sensing schedule.

In some examples, to support performing the sensing of the set of resources, the sidelink resource manager 1030 may be configured as or otherwise support a means for determining a reference signal received power threshold that provides a percentage of candidate resources in a resource selection window based on decoding sidelink information received on the sidelink communication link, where the message indicating the sensing results includes an indication of the reference signal received power threshold, the percentage of candidate resources, or any combination thereof.

In some examples, the reference signal received power threshold, the percentage of candidate resources, or any combination thereof, is configured by one or more UEs of the set of multiple UEs.

In some examples, to support performing the sensing of the set of resources, the decoder 1060 may be configured as or otherwise support a means for decoding sidelink control information received on the sidelink communication link. In some examples, to support performing the sensing of the set of resources, the sidelink resource manager 1030 may be configured as or otherwise support a means for performing the sensing of the set of resources based on one or more resource reservations indicated by the decoded sidelink control information, where the message indicating the sensing results includes resource information from the decoded sidelink control information.

In some examples, the resource information includes an indication of a reference signal received power for each resource of the set of resources, an indication of resources reserved based on the one or more resource reservations, an indication of the one or more candidate resources based on the one or more resource reservations, or any combination thereof.

In some examples, the message indicating the sensing results includes one or more reference signal received power measurement values that are based on performing the sensing of the set of resources. In some examples, the message indicating the sensing results excludes one or more reference signal received power measurement values that are based on performing the sensing of the set of resources.

In some examples, the transmission mode manager 1040 may be configured as or otherwise support a means for operating in a transmission mode during the second sensing window based on the second UE performing sensing of the set of resources during the second sensing window and the channel sensing schedule. In some examples, the transmission mode manager 1040 may be configured as or otherwise support a means for transmitting one or more messages on the sidelink communication link during the second sensing window based on operating in the transmission mode, the one or more messages transmitted on resources selected from the one or more candidate resources during a resource selection window.

In some examples, the sensing results component 1035 may be configured as or otherwise support a means for receiving, from a third UE of the set of multiple UEs, a message indicating sensing results based on the third UE sensing the set of resources during a third sensing window that is before the first sensing window. In some examples, the sensing results component 1035 may be configured as or otherwise support a means for identifying, during the resource selection window, the one or more candidate resources from the set of resources based on the sensing results from the third UE and the channel sensing schedule, the resource selection window subsequent to the third sensing window.

In some examples, the one or more candidate resources are identified during the first sensing window. In some examples, the power saving mode manager 1045 may be configured as or otherwise support a means for operating in a power saving mode based on the second UE performing sensing of the set of resources during the second sensing window.

In some examples, the channel sensing manager 1025 may be configured as or otherwise support a means for determining a first duration of the first sensing window and a second duration of the second sensing window based on the channel sensing schedule and the pattern, where the first duration, or the second duration, or both, is different from a duration of another sensing window associated with channel sensing operations that exclude the channel sensing schedule.

In some examples, the first duration of the first sensing window, the second duration of the second sensing window, or any combination thereof, is configured by one or more UEs of the set of multiple UEs.

In some examples, the channel sensing manager 1025 may be configured as or otherwise support a means for determining one or more subsets of frequency resources associated with the channel sensing schedule, where the first UE senses a first subset of frequency resources from the one or more subsets of frequency resources during the first sensing window, and where the second UE senses a second subset of frequency resources from the one or more subsets of frequency resources during the second sensing window.

In some examples, the pattern indicates that sensing is performed using the one or more subsets of frequency resources, or one or more sensing windows, or any combination thereof.

In some examples, the resource selection manager 1050 may be configured as or otherwise support a means for determining a resource selection window duration of the channel sensing schedule based on the pattern, where the resource selection window duration is independent of a packet delay budget. In some examples, the resource selection window duration is configured by one or more UEs of the set of multiple UEs.

In some examples, the capability manager 1055 may be configured as or otherwise support a means for transmitting, to at least one UE of the set of multiple UEs, a message indicating a channel sensing capability of the first UE, data traffic conditions of the first UE, or any combination thereof, where the channel sensing schedule is based on the channel sensing capability, the data traffic conditions, or any combination thereof. In some examples, the first sensing window and the second sensing window at least partially overlap in a time domain.

In some examples, the resource selection manager 1050 may be configured as or otherwise support a means for identifying respective resource selection windows corresponding to the first sensing window and the second sensing window based on the pattern, where the respective resource selection windows are continuous in the time domain, discontinuous in the time domain, or any combination thereof.

In some examples, the set of multiple UEs include a same group of UEs based on a location of the set of multiple UEs, a proximity of the set of multiple UEs, or any combination thereof.

Figure 11:
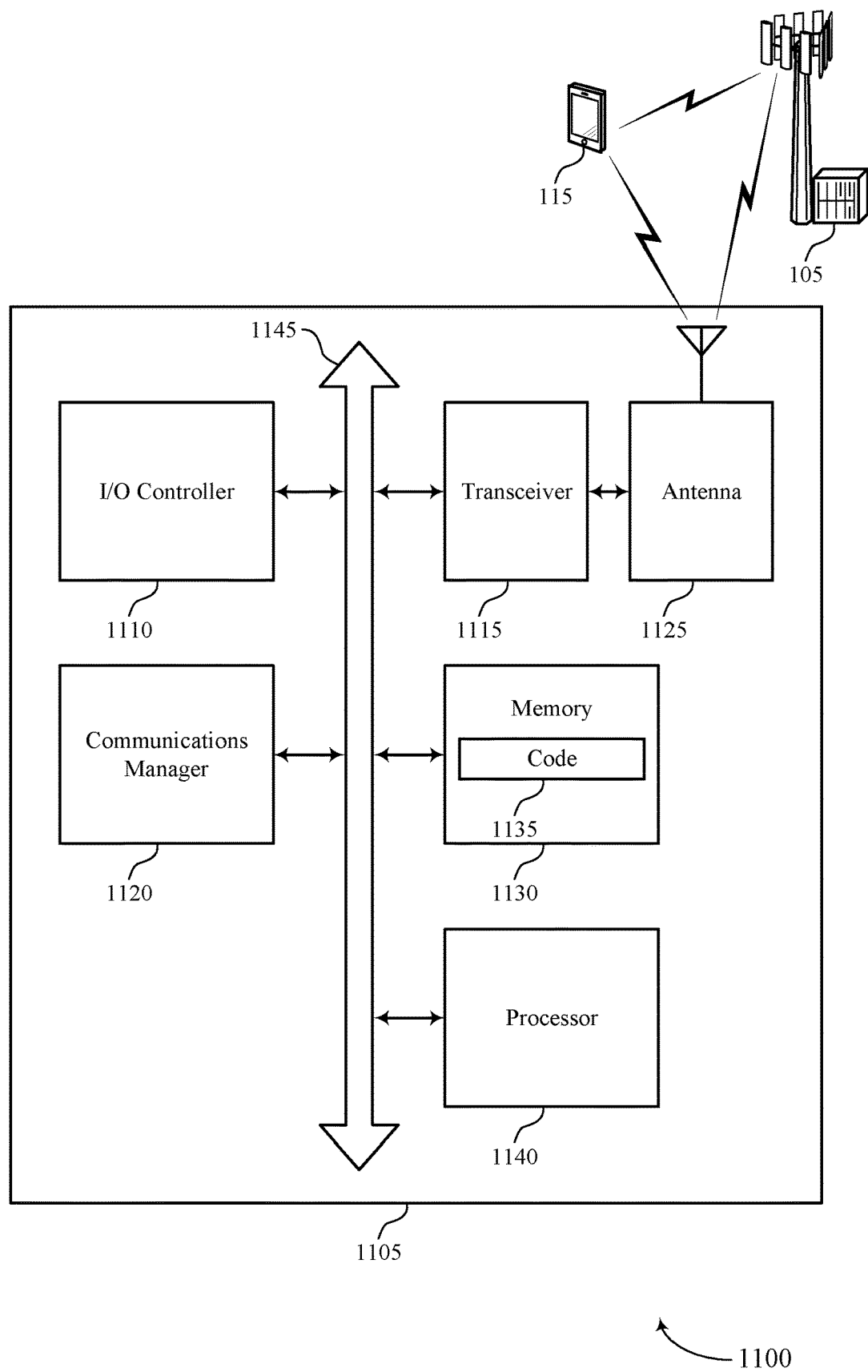
FIG. 11 shows a diagram of a system including a device in accordance with aspects of the present disclosure.

FIG. 11 shows a diagram of a system 1100 including a device 1105 in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting collaborative sensing and sharing for sidelink communications). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at a first UE in accordance with examples as disclosed herein. For example, the communications manager 1120 may be configured as or otherwise support a means for identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The communications manager 1120 may be configured as or otherwise support a means for performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern.

By including or configuring the communications manager 1120 in accordance with examples as described herein, the device 1105 may support techniques for performing collaborative channel sensing and sharing according to a channel sensing schedule. The channel sensing schedule may enable the device 1105 to perform channel sensing relatively less often or in a relatively shorter channel sensing window. The device 1105 may therefore reduce system latency, for instance, by selecting resources for a transmission without performing a sensing procedure (e.g., based on sensing results received from another device), or by sensing and selecting resources in a shorter time frame (e.g., based on a shorter sensing window).

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of collaborative sensing and sharing for sidelink communications as described herein, or the processor 1140 and the memory 1130 may be otherwise configured to perform or support such operations.

Figure 12:
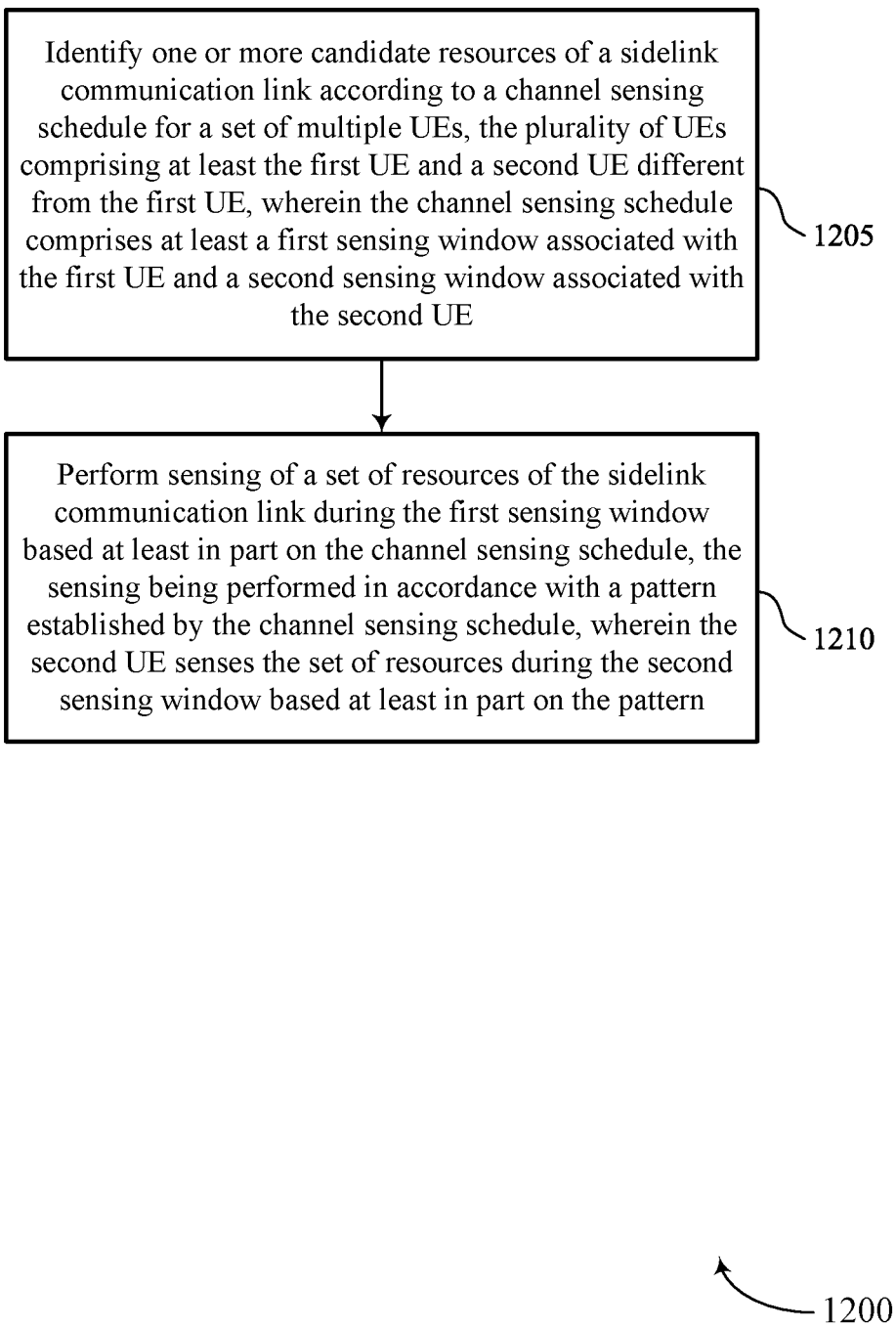

FIG. 12 shows a flowchart illustrating a method 1200 in accordance with aspects of the present disclosure. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1205, the method may include identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The operations of 1205 may be performed in accordance with examples as disclosed herein. In some examples, aspects of the operations of 1205 may be performed by a channel sensing manager 1025 as described with reference to FIG. 10.

At 1210, the method may include performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern. The operations of 1210 may be performed in accordance with examples as disclosed herein. In some examples, aspects of the operations of 1210 may be performed by a sidelink resource manager 1030 as described with reference to FIG. 10.

Figure 13:
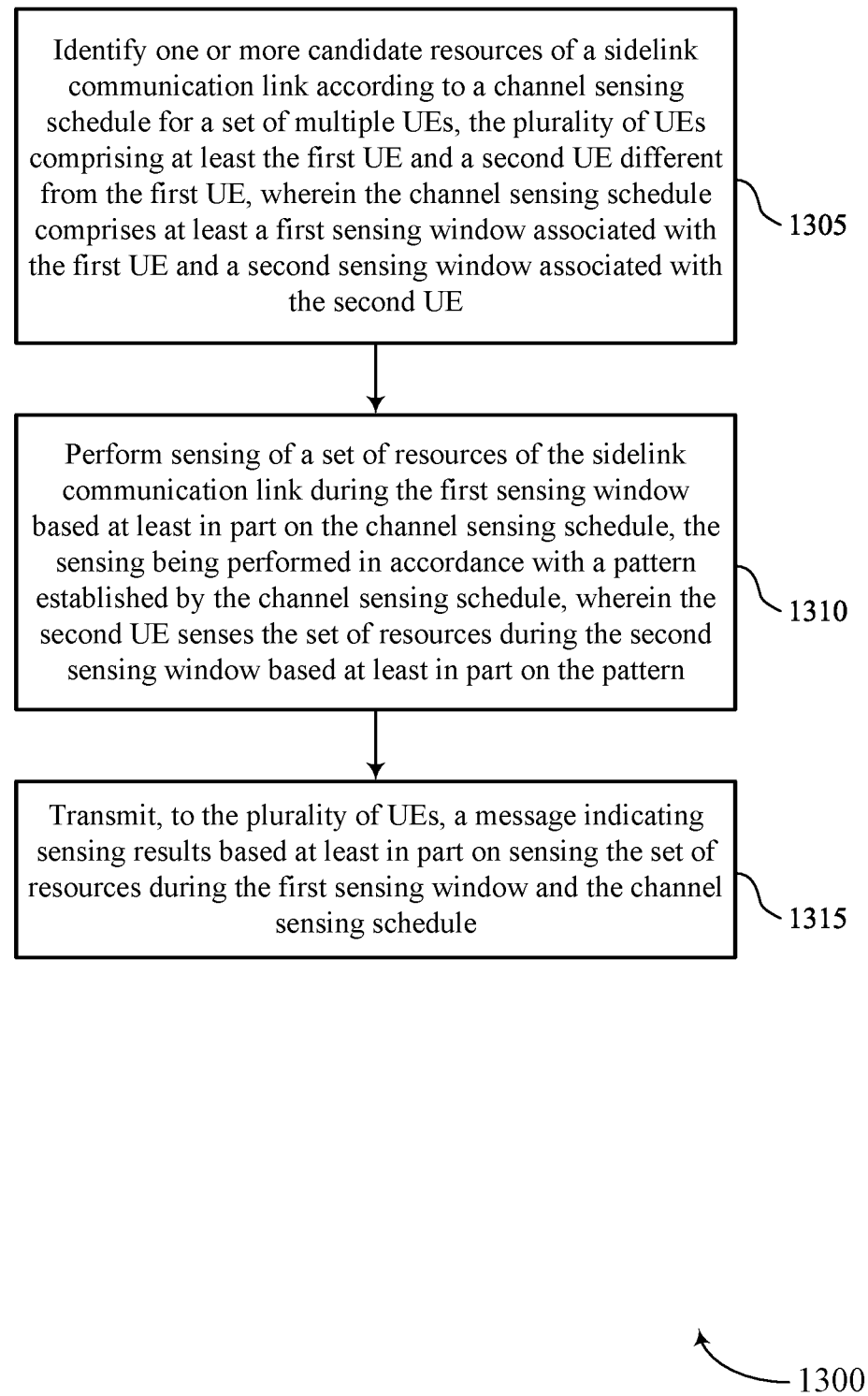

FIG. 13 shows a flowchart illustrating a method 1300 in accordance with aspects of the present disclosure. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1305, the method may include identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The operations of 1305 may be performed in accordance with examples as disclosed herein. In some examples, aspects of the operations of 1305 may be performed by a channel sensing manager 1025 as described with reference to FIG. 10.

At 1310, the method may include performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern. The operations of 1310 may be performed in accordance with examples as disclosed herein. In some examples, aspects of the operations of 1310 may be performed by a sidelink resource manager 1030 as described with reference to FIG. 10.

At 1315, the method may include transmitting, to the set of multiple UEs, a message indicating sensing results based on sensing the set of resources during the first sensing window and the channel sensing schedule. The operations of 1315 may be performed in accordance with examples as disclosed herein. In some examples, aspects of the operations of 1315 may be performed by a sensing results component 1035 as described with reference to FIG. 10.

Figure 14:
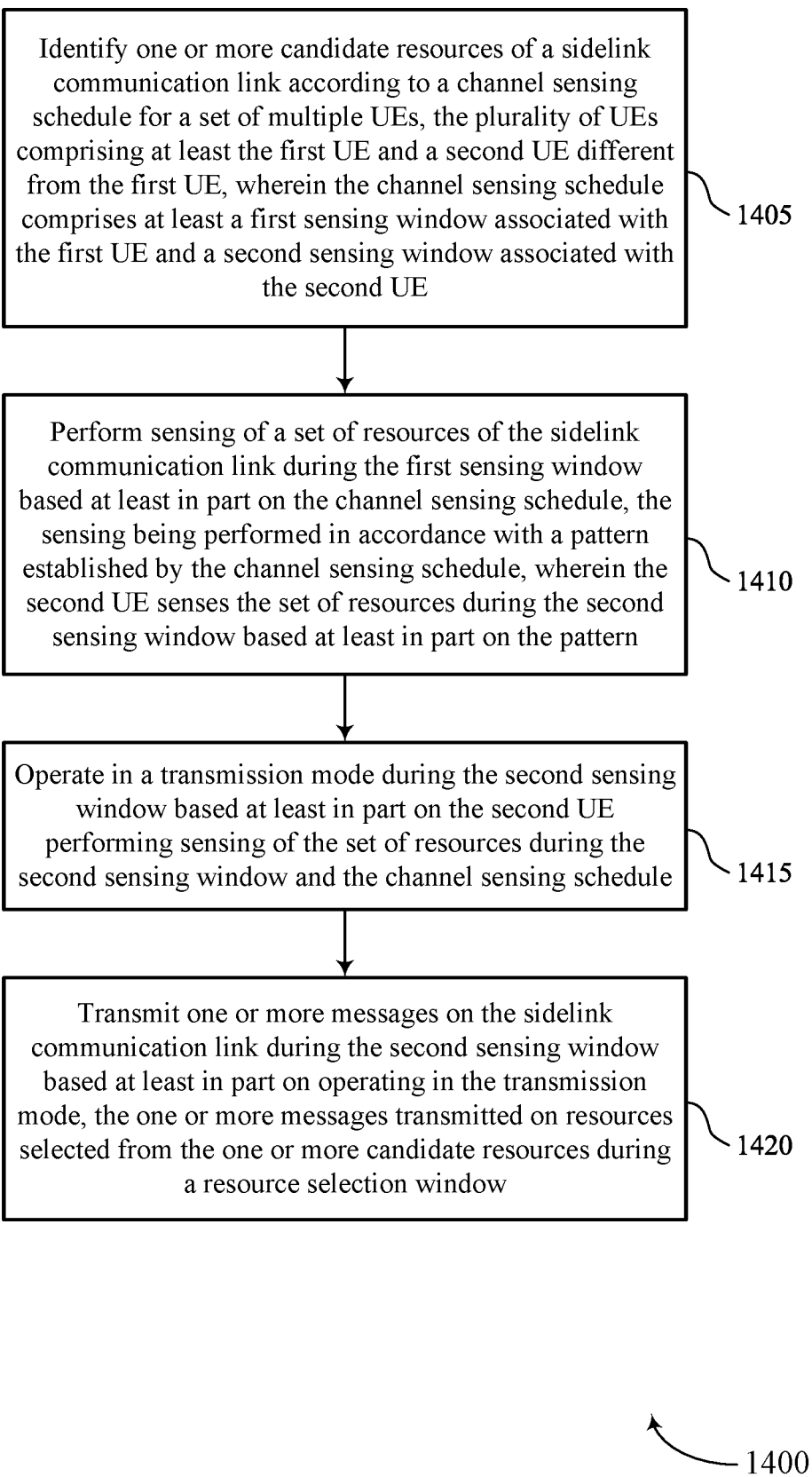

FIG. 14 shows a flowchart illustrating a method 1400 in accordance with aspects of the present disclosure. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1405, the method may include identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The operations of 1405 may be performed in accordance with examples as disclosed herein. In some examples, aspects of the operations of 1405 may be performed by a channel sensing manager 1025 as described with reference to FIG. 10.

At 1410, the method may include performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern. The operations of 1410 may be performed in accordance with examples as disclosed herein. In some examples, aspects of the operations of 1410 may be performed by a sidelink resource manager 1030 as described with reference to FIG. 10.

At 1415, the method may include operating in a transmission mode during the second sensing window based on the second UE performing sensing of the set of resources during the second sensing window and the channel sensing schedule. The operations of 1415 may be performed in accordance with examples as disclosed herein. In some examples, aspects of the operations of 1415 may be performed by a transmission mode manager 1040 as described with reference to FIG. 10.

At 1420, the method may include transmitting one or more messages on the sidelink communication link during the second sensing window based on operating in the transmission mode, the one or more messages transmitted on resources selected from the one or more candidate resources during a resource selection window. The operations of 1420 may be performed in accordance with examples as disclosed herein. In some examples, aspects of the operations of 1420 may be performed by a transmission mode manager 1040 as described with reference to FIG. 10.

Figure 15:
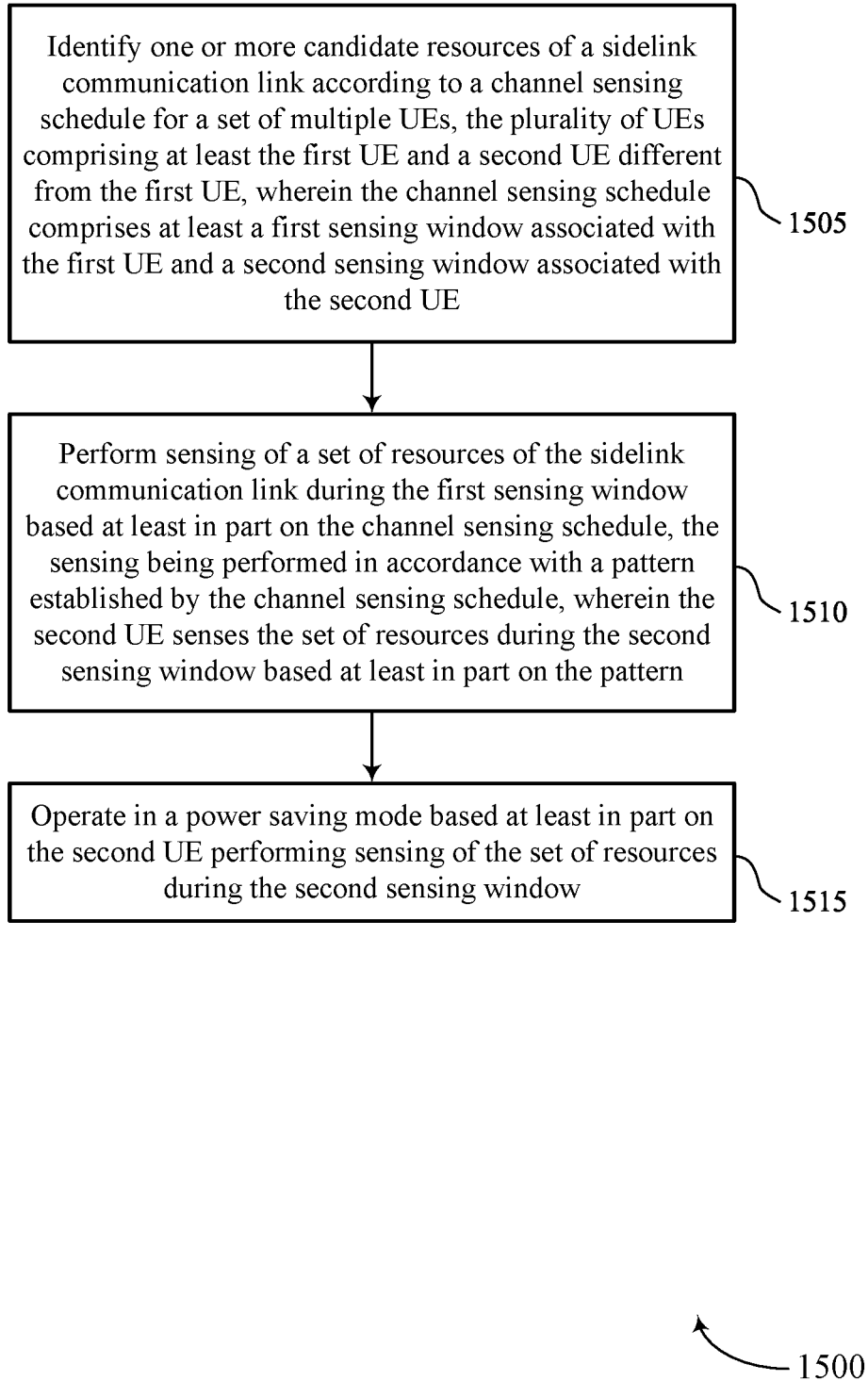

FIG. 15 shows a flowchart illustrating a method 1500 in accordance with aspects of the present disclosure. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1505, the method may include identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. The operations of 1505 may be performed in accordance with examples as disclosed herein. In some examples, aspects of the operations of 1505 may be performed by a channel sensing manager 1025 as described with reference to FIG. 10.

At 1510, the method may include performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern. The operations of 1510 may be performed in accordance with examples as disclosed herein. In some examples, aspects of the operations of 1510 may be performed by a sidelink resource manager 1030 as described with reference to FIG. 10.

At 1515, the method may include operating in a power saving mode based on the second UE performing sensing of the set of resources during the second sensing window. The operations of 1515 may be performed in accordance with examples as disclosed herein. In some examples, aspects of the operations of 1515 may be performed by a power saving mode manager 1045 as described with reference to FIG. 10.

FIG. 16 shows a flowchart illustrating a method 1600 in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include transmitting, to at least one UE of a set of multiple UEs, a message indicating a channel sensing capability of a first UE, data traffic conditions of the first UE, or any combination thereof. The operations of 1605 may be performed in accordance with examples as disclosed herein. In some examples, aspects of the operations of 1605 may be performed by a capability manager 1055 as described with reference to FIG. 10.

At 1610, the method may include identifying one or more candidate resources of a sidelink communication link according to a channel sensing schedule for a set of multiple UEs, the set of multiple UEs including at least the first UE and a second UE different from the first UE, where the channel sensing schedule includes at least a first sensing window associated with the first UE and a second sensing window associated with the second UE. In some examples, the channel sensing schedule is based on the channel sensing capability, the data traffic conditions, or any combination thereof. The operations of 1610 may be performed in accordance with examples as disclosed herein. In some examples, aspects of the operations of 1610 may be performed by a channel sensing manager 1025 as described with reference to FIG. 10.

At 1615, the method may include performing sensing of a set of resources of the sidelink communication link during the first sensing window based on the channel sensing schedule, the sensing being performed in accordance with a pattern established by the channel sensing schedule, where the second UE senses the set of resources during the second sensing window based on the pattern. The operations of 1615 may be performed in accordance with examples as disclosed herein. In some examples, aspects of the operations of 1615 may be performed by a sidelink resource manager 1030 as described with reference to FIG. 10.

Aspect 1: A method for wireless communication at a first UE, comprising: identifying one or more candidate resources of a sidelink communication link according to a channel sensing schedule for a set of multiple UEs, the plurality of UEs comprising at least the first UE and a second UE different from the first UE, wherein the channel sensing schedule comprises at least a first sensing window associated with the first UE and a second sensing window associated with the second UE; performing sensing of a set of resources of the sidelink communication link during the first sensing window based at least in part on the channel sensing schedule, the sensing being performed in accordance with a pattern established by the channel sensing schedule, wherein the second UE senses the set of resources during the second sensing window based at least in part on the pattern.

Aspect 2: The method of aspect 1, further comprising: transmitting, to the plurality of UEs, a message indicating sensing results based at least in part on sensing the set of resources during the first sensing window and the channel sensing schedule.

Aspect 3: The method of aspect 2, wherein performing the sensing of the set of resources comprises: determining a reference signal received power threshold that provides a percentage of candidate resources in a resource selection window based at least in part on decoding sidelink information received on the sidelink communication link, wherein the message indicating the sensing results comprises an indication of the reference signal received power threshold, the percentage of candidate resources, or any combination thereof.

Aspect 4: The method of aspect 3, wherein the reference signal received power threshold, the percentage of candidate resources, or any combination thereof, is configured by one or more UEs of the plurality of UEs.

Aspect 5: The method of any of aspects 2 through 4, wherein performing the sensing of the set of resources comprises: decoding sidelink control information received on the sidelink communication link; and performing the sensing of the set of resources based at least in part on one or more resource reservations indicated by the decoded sidelink control information, wherein the message indicating the sensing results comprises resource information from the decoded sidelink control information.

Aspect 6: The method of aspect 5, wherein the resource information comprises an indication of a reference signal received power for each resource of the set of resources, an indication of resources reserved based at least in part on the one or more resource reservations, an indication of the one or more candidate resources based at least in part on the one or more resource reservations, or any combination thereof.

Aspect 7: The method of any of aspects 5 through 6, wherein the message indicating the sensing results includes one or more reference signal received power measurement values that are based at least in part on performing the sensing of the set of resources.

Aspect 8: The method of any of aspects 5 through 6, wherein the message indicating the sensing results excludes one or more reference signal received power measurement values that are based at least in part on performing the sensing of the set of resources.

Aspect 9: The method of any of aspects 1 through 8, further comprising: operating in a transmission mode during the second sensing window based at least in part on the second UE performing sensing of the set of resources during the second sensing window and the channel sensing schedule; and transmitting one or more messages on the sidelink communication link during the second sensing window based at least in part on operating in the transmission mode, the one or more messages transmitted on resources selected from the one or more candidate resources during a resource selection window.

Aspect 10: The method of aspect 9, further comprising: receiving, from a third UE of the plurality of UEs, a message indicating sensing results based at least in part on the third UE sensing the set of resources during a third sensing window that is before the first sensing window; and identifying, during the resource selection window, the one or more candidate resources from the set of resources based at least in part on the sensing results from the third UE and the channel sensing schedule, the resource selection window subsequent to the third sensing window.

Aspect 11: The method of any of aspects 9 through 10, wherein the one or more candidate resources are identified during the first sensing window.

Aspect 12: The method of any of aspects 1 through 11, further comprising: operating in a power saving mode based at least in part on the second UE performing sensing of the set of resources during the second sensing window.

Aspect 13: The method of any of aspects 1 through 12, further comprising: determining a first duration of the first sensing window and a second duration of the second sensing window based at least in part on the channel sensing schedule and the pattern, wherein the first duration, or the second duration, or both, is different from a duration of another sensing window associated with channel sensing operations that exclude the channel sensing schedule.

Aspect 14: The method of aspect 13, wherein the first duration of the first sensing window, the second duration of the second sensing window, or any combination thereof, is configured by one or more UEs of the plurality of UEs.

Aspect 15: The method of any of aspects 1 through 14, further comprising: determining one or more subsets of frequency resources associated with the channel sensing schedule, wherein the first UE senses a first subset of frequency resources from the one or more subsets of frequency resources during the first sensing window, and wherein the second UE senses a second subset of frequency resources from the one or more subsets of frequency resources during the second sensing window.

Aspect 16: The method of aspect 15, wherein the pattern indicates that sensing is performed using the one or more subsets of frequency resources, or one or more sensing windows, or any combination thereof.

Aspect 17: The method of any of aspects 1 through 16, further comprising: determining a resource selection window duration of the channel sensing schedule based at least in part on the pattern, wherein the resource selection window duration is independent of a packet delay budget.

Aspect 18: The method of aspect 17, wherein the resource selection window duration is configured by one or more UEs of the plurality of UEs.

Aspect 19: The method of any of aspects 1 through 18, further comprising: transmitting, to at least one UE of the plurality of UEs, a message indicating a channel sensing capability of the first UE, data traffic conditions of the first UE, or any combination thereof, wherein the channel sensing schedule is based at least in part on the channel sensing capability, the data traffic conditions, or any combination thereof.

Aspect 20: The method of any of aspects 1 through 19, wherein the first sensing window and the second sensing window at least partially overlap in a time domain.

Aspect 21: The method of aspect 20, further comprising: identifying respective resource selection windows corresponding to the first sensing window and the second sensing window based at least in part on the pattern, wherein the respective resource selection windows are continuous in the time domain, discontinuous in the time domain, or any combination thereof.

Aspect 22: The method of any of aspects 1 through 21, wherein the plurality of UEs comprise a same group of UEs based at least in part on a location of the plurality of UEs, a proximity of the plurality of UEs, or any combination thereof.

Aspect 23: An apparatus for wireless communication at a first UE, comprising a processor; memory coupled with the processor; and instructions stored in the memory and executable by the processor to cause the apparatus to perform a method of any of aspects 1 through 22.

Aspect 24: An apparatus for wireless communication at a first UE, comprising at least one means for performing a method of any of aspects 1 through 22.

Aspect 25: A non-transitory computer-readable medium storing code for wireless communication at a first UE, the code comprising instructions executable by a processor to perform a method of any of aspects 1 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
    selecting one or more candidate resources of a sidelink communication link according to a channel sensing schedule for a plurality of UEs, the plurality of UEs comprising at least the first UE and a second UE different from the first UE, wherein the channel sensing schedule is associated with channel sensing by the plurality of UEs and comprises at least a first sensing window associated with the first UE and a second sensing window associated with the second UE; and
    performing sensing of a set of resources of the sidelink communication link during the first sensing window based at least in part on the channel sensing schedule, the sensing being performed in accordance with a pattern established by the channel sensing schedule and the channel sensing by the plurality of UEs, wherein the second UE senses the set of resources during the second sensing window based at least in part on the pattern.

2. The method of claim 1, further comprising:
    transmitting, to the plurality of UEs, a message indicating sensing results based at least in part on sensing the set of resources during the first sensing window and the channel sensing schedule.

3. The method of claim 2, wherein
    a reference signal received power threshold that provides a percentage of candidate resources in a resource selection window is based at least in part on decoding sidelink information received on the sidelink communication link, and wherein the message indicating the sensing results comprises an indication of the reference signal received power threshold, the percentage of candidate resources, or any combination thereof.

4. The method of claim 3, wherein the reference signal received power threshold, the percentage of candidate resources, or any combination thereof, is configured by one or more UEs of the plurality of UEs.

5. The method of claim 2, wherein performing the sensing of the set of resources comprises:
    decoding sidelink control information received on the sidelink communication link; and
    performing the sensing of the set of resources based at least in part on one or more resource reservations indicated by the decoded sidelink control information, wherein the message indicating the sensing results comprises resource information from the decoded sidelink control information.

6. The method of claim 5, wherein the resource information comprises an indication of a reference signal received power for each resource of the set of resources, an indication of resources reserved based at least in part on the one or more resource reservations, an indication of the one or more candidate resources based at least in part on the one or more resource reservations, or any combination thereof.

7. The method of claim 5, wherein the message indicating the sensing results includes one or more reference signal received power measurement values that are based at least in part on performing the sensing of the set of resources.

8. The method of claim 5, wherein the message indicating the sensing results excludes one or more reference signal received power measurement values that are based at least in part on performing the sensing of the set of resources.

9. The method of claim 1, further comprising:
    operating in a transmission mode during the second sensing window based at least in part on the second UE performing sensing of the set of resources during the second sensing window and the channel sensing schedule; and
    transmitting one or more messages on the sidelink communication link during the second sensing window based at least in part on operating in the transmission mode, the one or more messages transmitted on resources selected from the one or more candidate resources during a resource selection window.

10. The method of claim 9, further comprising:
    receiving, from a third UE of the plurality of UEs, a message indicating sensing results based at least in part on the third UE sensing the set of resources during a third sensing window that is before the first sensing window,
    wherein the one or more candidate resources from the set of resources are based at least in part on the sensing results from the third UE and the channel sensing schedule, and wherein the resource selection window is subsequent to the third sensing window.

11. The method of claim 9, wherein the one or more candidate resources are identified during the first sensing window.

12. The method of claim 1, further comprising:
    operating in a power saving mode based at least in part on the second UE performing sensing of the set of resources during the second sensing window.

13. The method of claim 1, further comprising:
    determining a first duration of the first sensing window and a second duration of the second sensing window based at least in part on the channel sensing schedule and the pattern, wherein the first duration, or the second duration, or both, is different from a duration of another sensing window associated with channel sensing operations that exclude the channel sensing schedule.

14. The method of claim 13, wherein the first duration of the first sensing window, the second duration of the second sensing window, or any combination thereof, is configured by one or more UEs of the plurality of UEs.

15. The method of claim 1,
    wherein one or more subsets of frequency resources are associated with the channel sensing schedule, wherein the first UE senses a first subset of frequency resources from the one or more subsets of frequency resources during the first sensing window, and wherein the second UE senses a second subset of frequency resources from the one or more subsets of frequency resources during the second sensing window.

16. The method of claim 15, wherein the pattern indicates that sensing is performed using the one or more subsets of frequency resources, or one or more sensing windows, or any combination thereof.

17. The method of claim 1,
wherein a resource selection window duration of the channel sensing schedule is based at least in part on the pattern, and wherein the resource selection window duration is independent of a packet delay budget.

18. The method of claim 17, wherein the resource selection window duration is configured by one or more UEs of the plurality of UEs.

19. The method of claim 1, further comprising:
transmitting, to at least one UE of the plurality of UEs, a message indicating a channel sensing capability of the first UE, data traffic conditions of the first UE, or any combination thereof, wherein the channel sensing schedule is based at least in part on the channel sensing capability, the data traffic conditions, or any combination thereof.

20. The method of claim 1, wherein the first sensing window and the second sensing window at least partially overlap in a time domain.

21. The method of claim 20,
wherein respective resource selection windows corresponding to the first sensing window and the second sensing window are based at least in part on the pattern, and wherein the respective resource selection windows are continuous in the time domain, discontinuous in the time domain, or any combination thereof.

22. The method of claim 1, wherein the plurality of UEs comprise a same group of UEs based at least in part on a location of the plurality of UEs, a proximity of the plurality of UEs, or any combination thereof.

23. An apparatus for wireless communication at a first user equipment (UE), comprising:
a processor;
memory coupled with the processor; and
instructions stored in the memory and executable by the processor to cause the apparatus to:
select one or more candidate resources of a sidelink communication link according to a channel sensing schedule for a plurality of UEs, the plurality of UEs comprising at least the first UE and a second UE different from the first UE, wherein the channel sensing schedule is associated with channel sensing by the plurality of UEs and comprises at least a first sensing window associated with the first UE and a second sensing window associated with the second UE; and
perform, using one or more antennas, sensing of a set of resources of the sidelink communication link during the first sensing window based at least in part on the channel sensing schedule, the sensing being performed in accordance with a pattern established by the channel sensing schedule and the channel sensing by the plurality of UEs, wherein the second UE senses the set of resources during the second sensing window based at least in part on the pattern.

24. The apparatus of claim 23, wherein the instructions are further executable by the processor to cause the apparatus to:
transmit, via a transmitter to the plurality of UEs, a message indicating sensing results based at least in part on sensing the set of resources during the first sensing window and the channel sensing schedule.

25. The apparatus of claim 23, wherein the instructions are further executable by the processor to cause the apparatus to:
operate in a transmission mode during the second sensing window based at least in part on the second UE performing sensing of the set of resources during the second sensing window and the channel sensing schedule; and
transmit, via a transmitter, one or more messages on the sidelink communication link during the second sensing window based at least in part on operating in the transmission mode, the one or more messages transmitted on resources selected from the one or more candidate resources during a resource selection window.

26. The apparatus of claim 25, wherein the instructions are further executable by the processor to cause the apparatus to:
receive, via a receiver and from a third UE of the plurality of UEs, a message indicating sensing results based at least in part on the third UE sensing the set of resources during a third sensing window that is before the first sensing window,
wherein the one or more candidate resources from the set of resources are based at least in part on the sensing results from the third UE and the channel sensing schedule, and wherein the resource selection window is subsequent to the third sensing window.

27. The apparatus of claim 23, wherein the instructions are further executable by the processor to cause the apparatus to:
operate in a power saving mode based at least in part on the second UE performing sensing of the set of resources during the second sensing window.

28. The apparatus of claim 23, wherein
a first duration of the first sensing window and a second duration of the second sensing window are based at least in part on the channel sensing schedule and the pattern, and wherein the first duration, or the second duration, or both, is different from a duration of another sensing window associated with channel sensing operations that exclude the channel sensing schedule.

29. An apparatus for wireless communication at a first user equipment (UE), comprising:
means for selecting one or more candidate resources of a sidelink communication link according to a channel sensing schedule for a plurality of UEs, the plurality of UEs comprising at least the first UE and a second UE different from the first UE, wherein the channel sensing schedule is associated with channel sensing by the plurality of UEs and comprises at least a first sensing window associated with the first UE and a second sensing window associated with the second UE; and
means for performing sensing of a set of resources of the sidelink communication link during the first sensing window based at least in part on the channel sensing schedule, the sensing being performed in accordance with a pattern established by the channel sensing schedule and the channel sensing by the plurality of UEs, wherein the second UE senses the set of resources during the second sensing window based at least in part on the pattern.

30. A non-transitory computer-readable medium storing code for wireless communication at a first user equipment (UE), the code comprising instructions executable by a processor to:
select one or more candidate resources of a sidelink communication link according to a channel sensing schedule for a plurality of UEs, the plurality of UEs comprising at least the first UE and a second UE different from the first UE, wherein the channel sensing schedule is associated with channel sensing by the plurality of UEs and comprises at least a first sensing window associated with the first UE and a second sensing window associated with the second UE; and perform sensing of a set of resources of the sidelink communication link during the first sensing window based at least in part on the channel sensing schedule, the sensing being performed in accordance with a pattern established by the channel sensing schedule and the channel sensing by the plurality of UEs, wherein the second UE senses the set of resources during the second sensing window based at least in part on the pattern.

* * * * *